United States Patent
Xu et al.

(10) Patent No.: US 11,212,054 B2
(45) Date of Patent: Dec. 28, 2021

(54) DATA TRANSMISSION METHOD AND APPARATUS

(71) Applicant: Huawei Technologies Co., Ltd., Shenzhen (CN)

(72) Inventors: Xiuqiang Xu, Shanghai (CN); Yan Chen, Shanghai (CN); Lei Wang, Shanghai (CN); Yinggang Du, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 161 days.

(21) Appl. No.: 16/546,664

(22) Filed: Aug. 21, 2019

(65) Prior Publication Data
US 2019/0379511 A1  Dec. 12, 2019

Related U.S. Application Data

(63) Continuation of application No. PCT/CN2018/076467, filed on Feb. 12, 2018.

(30) Foreign Application Priority Data

Feb. 22, 2017  (CN) .......................... 201710095718.7
Jan. 5, 2018  (CN) .......................... 201810010752.4

(51) Int. Cl.
*H04W 72/02*  (2009.01)
*H04L 5/00*  (2006.01)
(Continued)

(52) U.S. Cl.
CPC .......... *H04L 5/0053* (2013.01); *H04L 5/0037* (2013.01); *H04L 5/0051* (2013.01);
(Continued)

(58) Field of Classification Search
CPC ....... H04L 1/00; H04L 27/0008; H04L 27/26; H04L 5/0023; H04L 5/0037;
(Continued)

(56) References Cited

U.S. PATENT DOCUMENTS

2010/0303016 A1* 12/2010 Jin ...................... H04L 27/0008
                                                        370/328
2014/0153484 A1  6/2014 Kim et al.
(Continued)

FOREIGN PATENT DOCUMENTS

CN  101964697 A  2/2011
CN  102801509 A  11/2012
(Continued)

OTHER PUBLICATIONS

"NB-IoT—Remaining Issues for NPDSCH Design," Source: Ericsson, Document for: Discussion and Decision, Agenda Item: 2.2.3, 3GPP TSG RAN WG1 NB-IoT Ad-Hoc Meeting, R1-161986, Mar. 22-24, 2016, 10 pages.
(Continued)

*Primary Examiner* — Asad M Nawaz
*Assistant Examiner* — Zhaohui Yang
(74) *Attorney, Agent, or Firm* — Slater Matsil, LLP

(57) ABSTRACT

A data transmission method and apparatus for determining a transport block size, the method including obtaining, by a first device, a first parameter, where the first parameter is used to indicate a quantity of resource elements included in a resource mapping unit, determining, by the first device, a first transport block size based on the first parameter, and transmitting, by the first device, data based on the first transport block size.

17 Claims, 10 Drawing Sheets

(51) Int. Cl.
*H04L 27/00* (2006.01)
*H04W 72/04* (2009.01)

(52) U.S. Cl.
CPC ....... *H04L 27/0008* (2013.01); *H04W 72/042* (2013.01); *H04W 72/046* (2013.01)

(58) Field of Classification Search
CPC ... H04L 5/0046; H04L 5/0051; H04L 5/0053; H04L 5/0094; H04W 72/042; H04W 72/046
See application file for complete search history.

(56) References Cited

U.S. PATENT DOCUMENTS

| | | |
|---|---|---|
| 2015/0271802 A1 | 9/2015 | Kang et al. |
| 2016/0081063 A1* | 3/2016 | Chen ................ H04L 5/0023 370/329 |
| 2016/0226604 A1 | 8/2016 | Kazmi et al. |
| 2017/0156131 A1 | 6/2017 | Kimura et al. |
| 2018/0014320 A1 | 1/2018 | Xu et al. |

FOREIGN PATENT DOCUMENTS

| | | |
|---|---|---|
| CN | 103518398 A | 1/2014 |
| EP | 3258728 A1 | 12/2017 |
| EP | 3553980 A1 | 10/2019 |
| WO | 2016047246 A1 | 3/2016 |
| WO | 2016138632 A1 | 9/2016 |

OTHER PUBLICATIONS

Arikan, E., "Channel Polarization: A Method for Constructing Capacity-Achieving Codes for Symmetric Binary-Input Memoryless Channels," IEEE Transactions on Information Theory, vol. 55, No. 7, Jul. 2009, 23 pages.

Blasco-Serrano, R. et al., "Polar Codes for Cooperative Relaying," IEEE Transactions on Communications, vol. 60, No. 11, Nov. 2012, 11 pages.

* cited by examiner

DATA TRANSMISSION METHOD AND APPARATUS

CROSS-REFERENCE TO RELATED APPLICATIONS

This application is a continuation of International Patent Application No. PCT/CN2018/076467, filed on Feb. 12, 2018, which claims priority to Chinese Patent Application No. 201710095718.7, filed on Feb. 22, 2017 and Chinese Patent Application No. 201810010752.4, filed on Jan. 5, 2018. The disclosures of the aforementioned applications are hereby incorporated by reference in their entireties.

TECHNICAL FIELD

Embodiments of this application relate to the communications field, and more specifically, to a data transmission method and apparatus in the communications field.

BACKGROUND

In a network system, when transmitting data, a transceiver device needs to first determine a quantity of bits included in a transport block for data transmission, to be specific, a transport block size (TBS), then encode the data based on the TBS to obtain encoded data, and transmit the encoded data. However, when M modulated symbols are mapped to N resource elements, where M and N are positive integers, how to accurately calculate the TBS is a problem to be resolved urgently. For example, for a sparse code multiple access (SCMA) technology, two modulated symbols may be mapped to four resource elements. In this case, how to accurately determine the transport block size is a problem to be resolved urgently.

SUMMARY

This application provides a data transmission method and apparatus, to help improve accuracy of determining a transport block size, and improve data transmission reliability.

According to a first aspect, a data transmission method is provided. The method includes obtaining, by a first device, a first parameter, where the first parameter is used to indicate a quantity of resource elements (RE) included in a resource mapping unit, determining, by the first device, a first transport block size based on the first parameter, and transmitting, by the first device, data based on the first transport block size.

In this embodiment of this application, when the first transport block size is determined, the quantity of resource elements included in the resource mapping unit is considered, so that accuracy of determining a transport block size can be improved, and data transmission reliability can be improved.

Optionally, one resource mapping unit includes a resource element carrying a set of bits. A format of this set of bits is a modulation order Q. For example, in an orthogonal frequency division multiplexing (OFDM) technology, a modulated symbol obtained by modulating Q bits is mapped to an RE (that is, this RE carries the Q bits), so that the resource mapping unit includes one resource element, and the first parameter is 1. In an SCMA technology, two modulated symbols obtained by modulating Q bits are sparsely mapped to four REs (that is, the four REs carry the Q bits), so that the resource mapping unit includes four resource elements, and the first parameter is 4.

Optionally, the first device may be a terminal device or a network device.

In some implementations, the first device obtains a quantity of resource elements that are in an allocated physical resource and that are used to transmit data, a spatial layer quantity, a modulation order, and a bit rate, where the determining, by the first device, a first transport block size based on the first parameter includes determining, by the first device, the first transport block size based on the quantity of resource elements that are in the allocated physical resource and that are used to transmit data, the spatial layer quantity, the modulation order, the bit rate, and the first parameter.

Optionally, the quantity of resource elements that are in the allocated physical resource and that are used to transmit data may also be referred to as a quantity of available resource elements. That is, in the physical resource block, a quantity of resource elements not used in data transmission is the quantity of available resource elements, or in the physical resource block, a quantity of resource elements other than a quantity of resource elements occupied by a DMRS and an overhead is the quantity of available resource elements. For example, the overhead may be the quantity of resource elements not used in data transmission other than the quantity of resource elements of the DMRS.

In some implementations, the method further includes obtaining, by the first device, a non-orthogonal layer quantity corresponding to each spatial layer, and the determining, by the first device, the first transport block size based on the quantity of resource elements that are in the allocated physical resource and that are used to transmit data, the spatial layer quantity, the modulation order, the bit rate, and the first parameter includes determining, by the first device, the first transport block size based on the quantity of resource elements that are in the allocated physical resource and that are used to transmit data, the spatial layer quantity, the modulation order, the bit rate, the first parameter, and the non-orthogonal layer quantity corresponding to each spatial layer.

In some implementations, the determining, by the first device, the first transport block size based on the quantity of resource elements that are in the allocated physical resource and that are used to transmit data, the spatial layer quantity, the modulation order, the bit rate, and the first parameter includes determining, by the first device, the first transport block size according to any one of formulas (1), (2), and (3), $$TBS = N \cdot v \cdot Q \cdot R/F \quad (1)$$

$$TBS = \text{floor}(N \cdot v \cdot Q \cdot R/F) \quad (2)$$

$$TBS = \text{ceil}(N \cdot v \cdot Q \cdot R/F) \quad (3),$$

where TBS represents the first transport block size, N represents the quantity of resource elements that are in the allocated physical resource and that are used to transmit data, v represents the spatial layer quantity, Q represents the modulation order, R represents the bit rate, and F represents the first parameter.

In some implementations, the determining, by the first device, the first transport block size based on the quantity of resource elements that are in the allocated physical resource and that are used to transmit data, the spatial layer quantity, the modulation order, the bit rate, the first parameter, and the non-orthogonal layer quantity corresponding to each spatial layer includes determining, by the first device, the first transport block size according to any one of formulas (4), (5), and (6), $$TBS = N \cdot v \cdot Q \cdot R \cdot L \cdot /F \quad (4)$$

$$TBS = \text{floor}(N \cdot v \cdot Q \cdot R \cdot L \cdot /F) \quad (5)$$

$$TBS = \text{ceil}(N \cdot v \cdot Q \cdot R \cdot L \cdot /F) \quad (6),$$

where TBS represents the first transport block size, N represents the quantity of resource elements that are in the physical resource allocated on a first transmission resource and that are used to transmit data, v represents the spatial layer quantity, Q represents the modulation order, R represents the bit rate, L represents the non-orthogonal layer quantity corresponding to each spatial layer, and F represents the first parameter.

In some implementations, the determining, by the first device, the first transport block size based on the quantity of resource elements that are in the allocated physical resource and that are used to transmit data, the spatial layer quantity, the modulation order, the bit rate, the first parameter, and the non-orthogonal layer quantity corresponding to each spatial layer includes determining, by the first device, the first transport block size according to any one of formulas (7), (8), and (9), $$TBS = N \cdot Q \cdot R \cdot \Sigma_{i=1}^{v} L_i / F \quad (7)$$

$$TBS = \text{floor}(N \cdot Q \cdot R \cdot \Sigma_{i=1}^{v} L_i / F) \quad (8)$$

$$TBS = \text{ceil}(N \cdot Q \cdot R \cdot \Sigma_{i=1}^{v} L_i / F) \quad (9),$$

where TBS represents the first transport block size, N represents the quantity of resource elements that are in the physical resource allocated on a first transmission resource and that are used to transmit data, v represents the spatial layer quantity, Q represents the modulation order, R represents the bit rate, $L_i$ represents a non-orthogonal layer quantity corresponding to an $i^{th}$ spatial layer, and F represents the first parameter.

In some implementations, the transmitting, by the first device, data based on the first transport block size includes performing, by the first device, a first operation on the first transport block size to obtain a second transport block size, and transmitting, by the first device, the data by using the second transport block size.

In some implementations, the obtaining, by a first device, a first parameter includes obtaining, by the first device, the first parameter by using radio resource control signaling or downlink control information sent by a network device, and obtaining, by the first device, the first parameter by using a multiple access signature (MAS).

According to a second aspect, a data transmission method is provided. The method includes determining, by a first device, a non-orthogonal layer quantity, determining, by the first device, a transport block size (TBS), encoding, by the first device, data based on the non-orthogonal layer quantity and the TBS to obtain encoded data, and sending, by the first device, the encoded data to a second device.

In this embodiment of this application, the first device may perform encoding based on the determined non-orthogonal layer quantity and the transport block size (TBS). The non-orthogonal layer quantity is considered during encoding, so that encoding accuracy can further be improved, and data transmission performance can be improved.

Optionally, the first device may be a terminal device, and the second device may be a network device, the first device may be a network device, and the second device may be a terminal device, or the first device may be a terminal device, and the second device may be a terminal device.

In some implementations, the determining, by a first device, a non-orthogonal layer quantity includes determining, by the first device, the non-orthogonal layer quantity based on a modulation and coding scheme (MCS) table.

In this embodiment of this application, the MCS table includes the non-orthogonal layer quantity, and the first device determines the non-orthogonal layer quantity based on the modulation and coding scheme (MCS) table. When obtaining an MCS index, the first device determines a non-orthogonal layer quantity corresponding to the MCS index in the MCS table, and encodes data by using the non-orthogonal layer quantity to obtain encoded data. The non-orthogonal layer quantity is considered during encoding, so that data transmission reliability can be improved.

Optionally, the MCS table includes four parameters, namely, an MCS index, a modulation order, a non-orthogonal layer quantity, and a transport block size index. That is, provided that an MCS index is learned of, a corresponding modulation order, non-orthogonal layer quantity, and transport block size index can be determined based on the MCS index. Optionally, the first column of parameter of the MCS table may be the MCS index. Certainly, the first column of parameter may be alternatively the modulation order, the non-orthogonal layer quantity, or the transport block size index. For example, the second column of parameter may be the modulation order. The third column of parameter may be the non-orthogonal layer quantity. The fourth column of parameter may be the transport block size index. Alternatively, locations of the modulation order, the non-orthogonal layer quantity, and the transport block size index in the MCS table may be arbitrarily interchanged. For example, the second column of parameter may be the transport block size index, the third column of parameter may be the modulation order, and the fourth column of parameter may be the non-orthogonal layer quantity.

The first device is a terminal device, the second device is a network device, and the determining, by a first device, a non-orthogonal layer quantity includes receiving, by the first device, the non-orthogonal layer quantity sent by the second device. Optionally, the first device receives the non-orthogonal layer quantity that is sent by the second device by using downlink control information.

In some implementations, before the sending, by the first device, the encoded data to a second device, the method further includes determining, by the first device, a non-orthogonal layer, and the sending, by the first device, the encoded data to a second device includes sending, by the first device, the encoded data to the second device based on the non-orthogonal layer. In a process of sending the encoded data, the first device needs to learn of non-orthogonal layers specifically. For example, in a sparse code multiple access (SCMA) technology, different non-orthogonal layers correspond to different codebooks, and the different codebooks correspond to different resource mapping manners. After determining a non-orthogonal layer, the first device can determine a resource mapping manner, and map the encoded data in the determined resource mapping manner. For another example, in a pattern division multiple access (PDMA) technology, different non-orthogonal layers correspond to different signature sequences. After the first device can determine a non-orthogonal layer, the first device may determine a signature sequence, and may process data based on the determined signature sequence. For another example, in multi-user shared access (MUSA), different non-orthogonal layers correspond to different spreading sequences. After the first device can determine a non-orthogonal layer, the first device may determine a spreading sequence, and may modulate the encoded data based on the determined spreading sequence.

In some implementations, the determining, by the first device, a non-orthogonal layer includes determining, by the first device, a non-orthogonal start layer number, and determining, by the first device, the non-orthogonal layer based on the non-orthogonal start layer number and the non-orthogonal layer quantity.

In this embodiment of this application, for example, the first device is a terminal device, the second device is a network device, and the MCS index may be indicated by the network device to the terminal device. The MCS table includes the non-orthogonal layer quantity, and the terminal device may determine the non-orthogonal layer based on the non-orthogonal layer quantity and the start layer number. For example, if the non-orthogonal layer quantity is 3, and the start layer number is 1, the terminal device determines that non-orthogonal layers are the first layer, the second layer, and the third layer. For example, if the non-orthogonal layer quantity is 2, and the start layer number is 2, the terminal device determines that non-orthogonal layers are the second layer and the third layer.

In some implementations, alternatively, the non-orthogonal layer may be determined based on the non-orthogonal start layer number, the non-orthogonal layer quantity, and a non-orthogonal layer interval. For example, if the non-orthogonal start layer number is 1, the non-orthogonal layer quantity is 3, and the non-orthogonal layer interval is 2, non-orthogonal layers are the first layer, the third layer, and the fifth layer. How to determine the non-orthogonal layer is not limited in this embodiment of this application.

In some implementations, the first device is a terminal device, the second device is a network device, and the determining, by the first device, a non-orthogonal start layer number includes receiving, by the first device, the non-orthogonal start layer number sent by the second device. Optionally, the first device receives the non-orthogonal start layer number that is sent by the second device by using downlink control information.

In some implementations, the determining, by the first device, a non-orthogonal start layer number includes determining, by the first device, the non-orthogonal start layer number based on the MCS table.

In this embodiment of this application, assuming that the first device is a terminal device, and the second device is a network device, the non-orthogonal start layer number may be determined in two manners. In one manner, the MCS table includes such a parameter as the non-orthogonal start layer number, and the terminal device directly obtains the MCS index sent by the network device, finds, in the MCS table, the start layer number and the non-orthogonal layer quantity that correspond to the MCS index, and then determines a current non-orthogonal layer. In the other manner, the network device sends the non-orthogonal start layer number to the terminal device, and the terminal device determines the non-orthogonal layer based on the received start layer number and the non-orthogonal layer quantity in the MCS table.

In this embodiment of this application, the first device may determine the non-orthogonal layer in three manners. In a first manner, the first device is a terminal device, the first device receives a non-orthogonal layer quantity and a non-orthogonal start layer number that are sent by a network device, and the first device determines the non-orthogonal layer based on the received non-orthogonal layer quantity and the non-orthogonal start layer number. In a second manner, the first device is a terminal device, the first device receives a non-orthogonal start layer number sent by the second device, and the first device determines a non-orthogonal layer quantity in the MCS table and determines the non-orthogonal layer based on the non-orthogonal start layer number and the non-orthogonal layer quantity. In a third manner, the first device determines a non-orthogonal layer quantity and a non-orthogonal start layer number in the MCS table, and then determines the non-orthogonal layer based on the non-orthogonal layer quantity and the non-orthogonal start layer number.

In some implementations, the determining, by the first device, a TBS includes determining, by the first device, a TBS index in the MCS table, determining, by the first device, a TBS table based on the TBS index, and determining, by the first device, the TBS in the TBS table based on the non-orthogonal layer quantity.

In some implementations, the determining, by the first device, a transport block size TBS includes determining, by the first device, the TBS in a TBS table based on the non-orthogonal layer quantity.

In this embodiment of this application, the MCS table includes such a parameter as the TBS index. The first device may determine, based on a received MCS index, a TBS index corresponding to the MCS index. One TBS index corresponds to one TBS table. In addition, the first device may alternatively determine the non-orthogonal layer quantity, and then determine a transport block size in the TBS table by using the non-orthogonal layer quantity, and the first device encodes the data based on the transport block size and the non-orthogonal layer quantity. In this way, in a non-orthogonal multiple access technology, a correct transport block size can be determined, thereby ensuring data transmission reliability.

Optionally, the TBS table includes the non-orthogonal layer quantity and the transport block size. That is, provided that the non-orthogonal layer quantity is learned of, the transport block size can be learned of. For example, one non-orthogonal layer quantity corresponds to one transport block size, or one non-orthogonal layer quantity corresponds to two transport block sizes, and provided that the non-orthogonal layer quantity is obtained, the transport block size for transmitting data can be obtained.

In some implementations, the first device is a terminal device, the second device is a network device, and before the determining, by the first device, the TBS in the TBS table based on the non-orthogonal layer quantity, the method further includes receiving, by the first device, physical resource block size information sent by the network device, where the determining, by the first device, the TBS in a TBS table based on the non-orthogonal layer quantity includes determining, by the first device, the TBS in the TBS table based on the physical resource block size information and the non-orthogonal layer quantity.

In this embodiment of this application, the TBS table may further include a physical resource block size in addition to the non-orthogonal layer quantity and the transport block size. That is, the TBS table includes a correspondence between the physical resource block size and the non-orthogonal layer quantity, and also includes a correspondence between the non-orthogonal layer quantity and the transport block size. One physical resource block corresponds to at least one non-orthogonal layer, and one non-orthogonal layer corresponds to at least one transport block size. In this case, provided that the first device obtains the physical resource block size, the first device obtains the non-orthogonal layer quantity based on the correspondence between the physical resource block size and the non-orthogonal layer quantity. There may be one or more non-orthogonal layer quantities. The first device finds, in the one or more non-orthogonal layer quantities, the non-orthogonal layer quantity sent by the network device or the non-orthogonal layer quantity determined in the MCS table, then finds a corresponding transport block size based on the non-orthogonal layer quantity, and encodes data by using the transport block size and the non-orthogonal layer quantity to obtain encoded data.

In some implementations, the first device is a terminal device, the second device is a network device, and before the determining, by the first device, the TBS in the TBS table based on the non-orthogonal layer quantity, the method further includes receiving, by the first device, a spreading factor (SF) sent by the second device, where the determining, by the first device, the TBS in a TBS table based on the non-orthogonal layer quantity includes determining, by the first device, the TBS in the TBS table based on the spreading factor and the non-orthogonal layer quantity.

In this embodiment of this application, in terms of the TBS table, one SF may correspond to one TBS table. In this case, a plurality of SFs correspond to a plurality of TBS tables. Therefore, the terminal device needs to find a corresponding TBS table based on the SF, and then determine the transport block size in the TBS table. Alternatively, in terms of the TBS table, a plurality of SFs may correspond to one TBS table. In this case, the terminal device receives the SF sent by the network device, and then finds, in the TBS table, the transport block size corresponding to the SF for data transmission.

In some implementations, the TBS in the TBS table is determined according to a formula (33), $$TBS\_new = floor(TBS\_old * Layer/SF) \quad (33),$$

where TBS_new represents the TBS in the TBS table, TBS_old represents an old TBS in an old TBS table, Layer represents the non-orthogonal layer quantity, and SF represents the spreading factor.

In this embodiment of this application, the TBS may be obtained according to the formula (33). That is, the TBS in this embodiment of this application may be obtained based on the old TBS in the old TBS table, and the TBS in the TBS table refers to a new TBS.

In some implementations, before the determining, by the first device, the TBS in the TBS table based on the spreading factor and the non-orthogonal layer quantity, the method further includes determining, by the first device, an old TBS in an old TBS table, and determining, by the first device, the TBS table according to a formula (34), $$TBS\_new = floor(TBS\_old * Layer/SF) \quad (34),$$

where TBS_new represents the TBS in the TBS table, TBS_old represents the old TBS in the old TBS table, Layer represents the non-orthogonal layer quantity, and SF represents the spreading factor.

In this embodiment of this application, the TBS table stores the old TBS, and when a new TBS is required, the new TBS can be determined based on the non-orthogonal layer quantity, the spreading factor, and the old transport block size.

In some implementations, before the sending, by the first device, the encoded data to a second device, the method further includes determining, by the first device, a power offset, where the sending, by the first device, the encoded data to a second device includes sending, by the first device, the encoded data to the second device based on the power offset.

In this embodiment of this application, when the first device is a terminal device, a plurality of non-orthogonal layers may be allocated to one terminal device, or a plurality of non-orthogonal layers are allocated to different terminal devices, and the network device uses a same channel to send downlink data on the plurality of non-orthogonal layers. When receiving the data, the terminal device cannot distinguish, by using a phase, between data sent to the terminal device. Therefore, the network device needs to notify each terminal device of a power offset of the terminal device. In this case, each terminal device can obtain data through decoding based on the power offset of the terminal device.

In some implementations, the first device is a terminal device, the second device is a network device, and the determining, by the first device, a power offset includes receiving, by the first device, the power offset sent by the second device. Specifically, the first device may receive the power offset that is sent by the second device by using downlink control information.

In some implementations, the MCS table further includes a power offset parameter, and the determining, by the first device, a power offset includes determining, by the second device, the power offset based on the MCS table.

In some implementations, the determining, by the first device, a power offset includes determining, by the first device, the power offset based on a TBS table.

In some implementations, the determining, by the first device, a power offset includes determining, by the first device, the power offset by using a bit rate and/or a modulation order.

In this embodiment of this application, there may be four manners of determining the parameter of the power offset. In a first manner, when the first device is a terminal device, and the second device is a network device, the first device receives the determined power offset sent by the second device. In a second manner, the MCS table includes the parameter of the power offset, and the first device determines the power offset in the MCS table. In a third manner, the TBS table includes the parameter of the power offset, and the first device may determine the power offset in the TBS table. In a fourth manner, there may be a mapping relationship between the power offset and the bit rate and/or modulation order. Therefore, the power offset may be determined based on the bit rate and/or the modulation order and the mapping relationship therebetween.

According to a third aspect, a data transmission method is provided. The method includes determining, by the first device, a power offset, and sending, by the first device, data to a second device based on the power offset.

In this embodiment of this application, if a non-orthogonal multiple access technology is used, when two terminal devices simultaneously send data, there is interference. Therefore, each terminal device needs to learn of a power offset of the terminal device. In this case, an error bit rate of the transmitted data can be reduced.

In some implementations, the first device is a terminal device, the second device is a network device, and the determining, by the first device, a power offset includes receiving, by the first device, the power offset sent by the second device. Optionally, the first device receives the power offset sent by the second device by using the downlink control information.

In some implementations, the determining, by the first device, a power offset includes determining, by the first device, the power offset in an MCS table.

In some implementations, the determining, by the first device, a power offset includes determining, by the first device, the power offset in a TBS table.

In some implementations, the determining, by the first device, a power offset includes determining, by the first device, the power offset by using a bit rate and/or a modulation order.

According to a fourth aspect, a data transmission method is provided. The method includes obtaining, by a first device, a non-orthogonal layer quantity, obtaining, by the first device, a spreading factor, determining, by the first device, a new TBS based on the non-orthogonal layer quantity, the spreading factor, and an old TBS in an old transport block size TBS table, encoding, by the first device, data based on the non-orthogonal layer quantity and the new TBS to obtain encoded data, and sending, by the first device, the encoded data to a second device.

In some implementations, the determining, by the first device, a new TBS based on the non-orthogonal layer quantity, the spreading factor, and an old TBS in an old transport block size TBS table includes determining, by the first device, the new TBS according to a formula (33), $$TBS\_new = floor(TBS\_old * Layer/SF) \quad (33),$$

where TBS_new represents the new TBS, TBS_old represents the old TBS in the old TBS table, Layer represents the non-orthogonal layer quantity, and SF represents the spreading factor.

According to a fifth aspect, a data transmission apparatus is provided. The apparatus is configured to perform the method according to any one of the first aspect or the possible implementations of the first aspect. Specifically, the apparatus includes units configured to perform the method according to any one of the first aspect or the possible implementations of the first aspect.

According to a sixth aspect, a data transmission apparatus is provided. The apparatus is configured to perform the method according to any one of the second aspect or the possible implementations of the second aspect. Specifically, the apparatus includes units configured to perform the method according to any one of the second aspect or the possible implementations of the second aspect.

According to a seventh aspect, a data transmission apparatus is provided. The apparatus is configured to perform the method according to any one of the third aspect or the possible implementations of the third aspect. Specifically, the apparatus includes a unit configured to perform the method according to any one of the third aspect or the possible implementations of the third aspect.

According to an eighth aspect, a data transmission apparatus is provided. The apparatus is configured to perform the method according to any one of the fourth aspect or the possible implementations of the fourth aspect. Specifically, the apparatus includes units configured to perform the method according to any one of the fourth aspect or the possible implementations of the fourth aspect.

According to a ninth aspect, a data transmission apparatus is provided. The apparatus includes a transceiver (which may include a transmitter and a receiver), a memory, and a processor. The transceiver, the memory, and the processor communicate with each other by using an internally connected channel. The memory is configured to store an instruction, and the processor is configured to execute the instruction stored in the memory, to control the receiver to receive a signal and control the transmitter to send a signal, so that the apparatus performs the method according to any one of the first aspect or the possible implementations of the first aspect.

According to a tenth aspect, a data transmission apparatus is provided. The apparatus includes a transceiver (which may include a transmitter and a receiver), a memory, and a processor. The transceiver, the memory, and the processor communicate with each other by using an internally connected channel. The memory is configured to store an instruction, and the processor is configured to execute the instruction stored in the memory, to control the receiver to receive a signal and control the transmitter to send a signal, so that the apparatus performs the method according to any one of the second aspect or the possible implementations of the second aspect.

According to an eleventh aspect, a data transmission apparatus is provided. The apparatus includes a transceiver (which may include a transmitter and a receiver), a memory, and a processor. The transceiver, the memory, and the processor communicate with each other by using an internally connected channel. The memory is configured to store an instruction, and the processor is configured to execute the instruction stored in the memory, to control the receiver to receive a signal and control the transmitter to send a signal, so that the apparatus performs the method according to any one of the third aspect or the possible implementations of the third aspect.

According to a twelfth aspect, a data transmission apparatus is provided. The apparatus includes a transceiver (which may include a transmitter and a receiver), a memory, and a processor. The transceiver, the memory, and the processor communicate with each other by using an internally connected channel. The memory is configured to store an instruction, and the processor is configured to execute the instruction stored in the memory, to control the receiver to receive a signal and control the transmitter to send a signal, so that the apparatus performs the method according to any one of the fourth aspect or the possible implementations of the fourth aspect.

According to a thirteenth aspect, a computer readable storage medium is provided. The computer readable storage medium stores an instruction, and when the instruction is run on a computer, the computer is enabled to perform the method according to any one of the first aspect or the possible implementations of the first aspect.

According to a fourteenth aspect, a computer readable storage medium is provided. The computer readable storage medium stores an instruction, and when the instruction is run on a computer, the computer is enabled to perform the method according to any one of the second aspect or the possible implementations of the second aspect.

According to a fifteenth aspect, a computer readable storage medium is provided. The computer readable storage medium stores an instruction, and when the instruction is run on a computer, the computer is enabled to perform the method according to any one of the third aspect or the possible implementations of the third aspect.

According to a sixteenth aspect, a computer readable storage medium is provided. The computer readable storage medium stores an instruction, and when the instruction is run on a computer, the computer is enabled to perform the method according to any one of the fourth aspect or the possible implementations of the fourth aspect.

According to a seventeenth aspect, this application provides a computer program product including an instruction, and when the product is run on a computer, the computer is enabled to perform the method according to any one of the first aspect or the possible implementations of the first aspect.

According to an eighteenth aspect, this application provides a computer program product including an instruction, and when the product is run on a computer, the computer is enabled to perform the method according to any one of the second aspect or the possible implementations of the second aspect.

According to a nineteenth aspect, this application provides a computer program product including an instruction, and when the product is run on a computer, the computer is enabled to perform the method according to any one of the third aspect or the possible implementations of the third aspect.

According to a twentieth aspect, this application provides a computer program product including an instruction, and when the product is run on a computer, the computer is enabled to perform the method according to any one of the fourth aspect or the possible implementations of the fourth aspect.

According to a twenty-first aspect, this application provides a communications chip storing an instruction, and when the communications chip is run on a first device, the first device is enabled to perform the method according to any one of the foregoing aspects.

DETAILED DESCRIPTION OF ILLUSTRATIVE EMBODIMENTS

The following describes the technical solutions in this application with reference to the accompanying drawings.

It should be understood that, the technical solutions in embodiments of this application may be applied to various communications systems, such as a global system for mobile communications (global system for mobile communication, GSM) system, a code division multiple access (code division multiple access, CDMA) system, a wideband code division multiple access (wideband code division multiple access, WCDMA) system, a general packet radio service (general packet radio service, GPRS), a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, a wireless local area network (wireless local area network, WLAN), or a future fifth-generation wireless communications system (the fifth generation, 5G).

Figure 1:
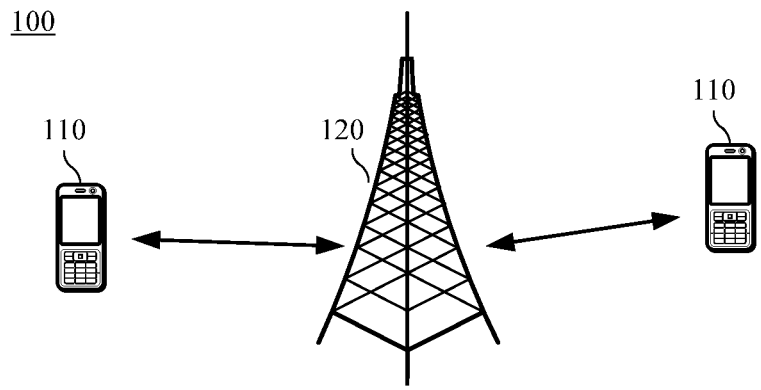
FIG. 1 is a schematic diagram of a communications system applied to an embodiment of this application.

FIG. 1 shows a communications system 100 applied to the embodiments of this application. The communications system 100 may include a terminal device no and a network device 120. The terminal device no in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. Alternatively, the terminal device may be alternatively a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a wearable device, a terminal device in a future 5G network, or a terminal device in a future evolved public land mobile network (Public Land Mobile Network, PLMN). This is not limited in the embodiments of this application.

The network device 120 in the embodiments of this application may be a device configured to communicate with the terminal device no. The network device may be a base transceiver station (base transceiver station, BTS) in a GSM system or CDMA, a NodeB (NodeB, NB) in a WCDMA system, an evolved NodeB (evolved NodeB, eNB or eNodeB) in an LTE system, or a wireless controller in a cloud radio access network (cloud radio access network, CRAN) scenario, or the network device may be a relay station, an access point, a vehicle-mounted device, a wearable device, a device that communicates with the terminal device in a future 5G network, a device that communicates with the terminal device in a future evolved PLMN network, or the like. This is not limited in the embodiments of this application.

It should be understood that, there may be one or more terminal devices 110, and the embodiments of this application are described by using only one terminal device as an example. Optionally, in the embodiments of this application, the communications device may be a terminal device or a network device, or the communications device may be a chip. This is not limited in the embodiments of this application.

When the network device and the terminal device communicate with each other, channel encoding needs to be performed on to-be-transmitted data based on a transport block size. A manner of determining the transport block size is determining a TBS index in an MCS table based on an MCS index, and then determining the TBS in a TBS table based on the TBS index. Table 1 is an MCS table. The first column in the MCS table represents the MCS index, the second column represents a modulation order, and the third column represents the TBS index. When the terminal device receives an MCS index, namely, 0, sent by the network device, the terminal device finds a TBS index corresponding to the index 0, namely, 0, and finds a TBS table, for example, Table 2, in which the TBS index is 0.

TABLE 1

| MCS index ($I_{MCS}$) | Modulation order ($Q_m$) | TBS index ($I_{TBS}$) |
| --- | --- | --- |
| 0 | 4 | 0 |

In Table 2, one TBS index corresponds to one TBS table. The network device sends indication information to the terminal device by using downlink control information (downlink control information, DCI) or a radio resource control (radio resource control, RRC) instruction, and the indication information is used to indicate an MCS index and a physical resource block quantity $N_{PRB}$. In this case, when the terminal device obtains the MCS index and $N_{PRB}$, the terminal device finds a TBS index, namely, 0, in Table 1 based on the MCS index, determines $N_{PRB}$ based on the indication information sent by the network device, and finds a transport block size corresponding to $N_{PRB}$ in Table 2, and the terminal device transmits data based on the transport block size. For example, the network device sends indication information by using downlink control information, and the terminal device determines that $N_{PRB}$ is 4 based on the indication information, and then finds, in Table 2, that the transport block size is 88. However, when the terminal device accesses the network device through non-orthogonal multiple access, if an existing MCS table is directly used, parameters related to the non-orthogonal multiple access cannot be obtained by using the existing MCS table because the existing MCS table is an orthogonal multiple access form, and consequently, encoding cannot be performed. For example, the network device learns of such a parameter as a non-orthogonal layer quantity, the terminal device does not learn of the non-orthogonal layer quantity, and the network device decodes, based on the non-orthogonal layer quantity, data sent by the terminal device. However, the terminal device does not perform encoding based on the non-orthogonal layer quantity, causing relatively poor data transmission performance. Further, a transport block size mapped to two non-orthogonal layers is twice that mapped to one layer, and if the two non-orthogonal layers are not considered, and the transport block size mapped to one layer is still used for encoding, a data transmission size is limited, for example, bits used for error correction coding are reduced in quantity, causing relatively poor transmission performance during data transmission.

TABLE 2

| | $N_{PRB}$ | | | | | | | |
| --- | --- | --- | --- | --- | --- | --- | --- | --- |
| $I_{TBS}$ | 1 | 2 | 3 | 4 | 5 | 6 | 7 | 8 |
| 0 | 16 | 32 | 56 | 88 | 120 | 152 | 176 | 208 |

In a possible implementation, when a plurality of non-orthogonal layers are used in sending data, a user needs to learn how many non-orthogonal layers are used. Therefore, the MCS table may also include such a parameter as the non-orthogonal layer quantity. In this case, the terminal device or the network device may obtain the non-orthogonal layer quantity in the MCS table. Therefore, the non-orthogonal layer quantity can be considered in an encoding process, so that data can be reliably transmitted when the user uses a non-orthogonal multiple access technology.

A data transmission method in the embodiments of this application is described below with reference to the accompanying drawings.

Figure 2:
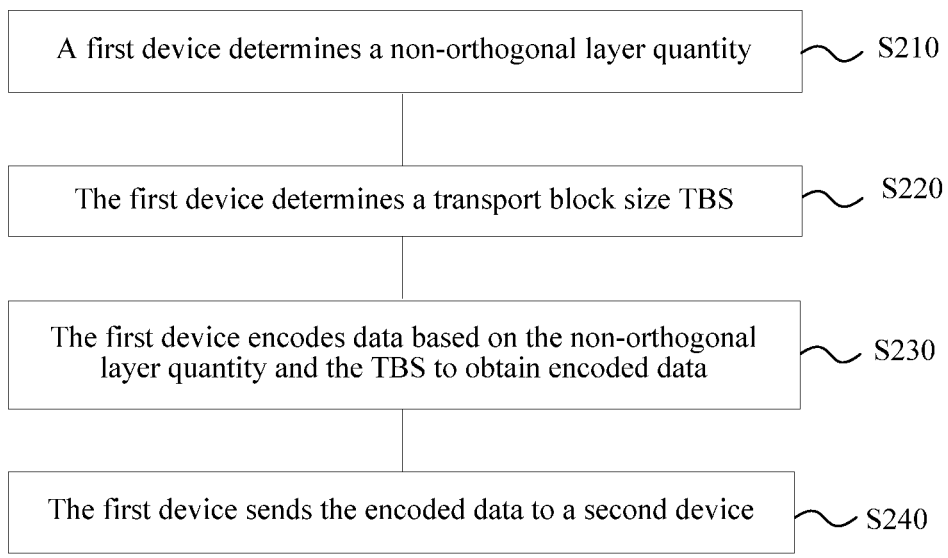
FIG. 2 is a schematic diagram of a data transmission method according to an embodiment of this application.

For example, FIG. 2 shows a data transmission method according to an embodiment of this application. A non-orthogonal layer quantity may be considered in an encoding process, and the method 200 includes the following.

S210. A first device determines a non-orthogonal layer quantity.

In an optional embodiment, S210 includes determining, by the first device, the non-orthogonal layer quantity based on a modulation and coding scheme MCS table. For example, in this embodiment of this application, the MCS table may be in a form of Table 3. The first column of the MCS table is an MCS index, the second column is a modulation order, the third column is a non-orthogonal layer quantity, and the fourth column is a TBS index. When obtaining an MCS index, the first device determines a modulation order, a non-orthogonal layer quantity, and a TBS index based on the MCS index, and then finds a TBS table corresponding to the TBS index. For a non-orthogonal multiple access technology, different non-orthogonal multiple access technologies correspond to different modulation methods and different non-orthogonal layer quantities. Therefore, a device sending data needs to determine a TBS, a non-orthogonal layer quantity, bandwidth, and a modulation order, and then perform channel encoding, modulation, and sending based on such four parameters as the TBS, the non-orthogonal layer quantity, the bandwidth, and the modulation order.

TABLE 3

| MCS index ($I_{MCS}$) | Modulation order ($Q_m$) | Non-orthogonal layer quantity (#Layer) | TBS Index ($I_{TBS}$) |
| --- | --- | --- | --- |
| 0 | 4 | 1 | 0 |
| 1 | 4 | 2 | 1 |
| 2 | 4 | 4 | 2 |
| 3 | 4 | 6 | 3 |
| 4 | 8 | 2 | 4 |
| 5 | 8 | 4 | 5 |

In an optional embodiment, S210 includes receiving, by the first device, the non-orthogonal layer quantity sent by a second device. The non-orthogonal layer quantity can also be obtained by using downlink control information in addition to the MCS table.

S220. The first device determines a transport block size TBS.

In an optional embodiment, S220 includes determining, by the first device, the TBS in a TBS table based on the non-orthogonal layer quantity. The MCS table includes such a parameter as the TBS index. The first device may determine, based on a received MCS index, a TBS index corresponding to the MCS index. One TBS index corresponds to one TBS table. In addition, the first device may determine the non-orthogonal layer quantity, and then determine the transport block size in the TBS table by using the non-orthogonal layer quantity. The first device encodes data based on the transport block size and the non-orthogonal layer quantity. In this way, in the non-orthogonal multiple access technology, a correct transport block size can be determined, thereby ensuring data transmission reliability. For example, a TBS corresponding to one non-orthogonal layer is 80, and a TBS corresponding to two non-orthogonal layers may be 160. This is equivalent that, each time a non-orthogonal layer is added, a to-be-transmitted data volume is increased. For example, a quantity of bits used for error correction coding can be increased, so that the data transmission reliability is further improved.

In an optional embodiment, before the determining, by the first device, the TBS in a TBS table based on the non-orthogonal layer quantity, the method 200 further includes receiving, by the first device, physical resource block size information sent by the second device, and the determining, by the first device, the TBS in a TBS table based on the non-orthogonal layer quantity includes determining, by the first device, the TBS in the TBS table based on the physical resource block size information and the non-orthogonal layer quantity. For example, a physical resource size sent by the network device is 12, an SF sent by the network device is 4, and the non-orthogonal layer quantity determined by the first device is 6. For example, the transport block size obtained through lookup in Table 4 is 24.

In an optional embodiment, before the determining, by the first device, the TBS in a TBS table based on the non-orthogonal layer quantity, the method further includes receiving, by the first device, a spreading factor sent by the second device, and the determining, by the first device, the TBS in a TBS table based on the non-orthogonal layer quantity includes determining, by the first device, the TBS in the TBS table based on the spreading factor and the non-orthogonal layer quantity. The spreading factor may be a quantity of resources included in one resource mapping unit. For example, in an SCMA technology, during encoding, four subcarriers are used as one resource mapping unit, and the SF may be four.

For example, the TBS table may further include a physical resource block size in addition to the non-orthogonal layer quantity and the transport block size. That is, the TBS table includes a correspondence between the physical resource block size and the non-orthogonal layer quantity, and also includes a correspondence between the non-orthogonal layer quantity and the transport block size. A physical resource block size corresponds to at least one non-orthogonal layer quantity, and one non-orthogonal layer quantity corresponds to at least one transport block size. In this case, provided that the first device obtains the physical resource block size, the first device obtains the non-orthogonal layer quantity based on the correspondence between the physical resource block size and the non-orthogonal layer quantity. There may be one or more non-orthogonal layer quantities. The first device finds, in the one or more non-orthogonal layer quantities, the non-orthogonal layer quantity sent by the second device or the non-orthogonal layer quantity determined in the MCS table, then finds a corresponding transport block size based on the non-orthogonal layer quantity, and encodes data by using the transport block size and the non-orthogonal layer quantity to obtain encoded data.

For example, Table 4 is a TBS table provided in this embodiment of this application. The first device first finds a TBS index through lookup in an MCS table, and then finds a TBS table corresponding to the TBS index. For example, the first device finds that the TBS index is 0 through lookup in the MCS table, and finds that a form of the TBS table is shown in Table 4. The TBS table may include four parameters, a physical resource block size $N_{PRB}$, a spreading factor SF, a non-orthogonal layer quantity $N_{Layer}$, and a transport block size. Optionally, the TBS table may only include at least one of a transport block size, a physical resource block size $N_{PRB}$, a spreading factor SF, and a non-orthogonal layer quantity $N_{Layer}$.

TABLE 4

| TBS index ($I_{TBS}$) | $N_{PRB}$ | | | | | | | | |
|---|---|---|---|---|---|---|---|---|---|
| | 12 SF = 4 | | | | 10 SF = 8 | | | | |
| | $N_{Layer}$ | | | | | | | | |
| | 1 | 2 | 4 | 6 | 1 | 2 | 4 | 8 | 12 |
| 0 | 4 | 8 | 16 | 24 | 2 | 4 | 8 | 16 | 24 |

Optionally, in terms of the TBS table, one SF may correspond to one TBS table. In this case, a plurality of SFs correspond to a plurality of TBS tables. Therefore, the terminal device needs to find a corresponding TBS table based on an SF, and then determine a transport block size in the TBS table. Alternatively, in terms of the TBS table, a plurality of SFs may correspond to one TBS table. In this case, the first device receives an SF sent by the second device, and then finds, in the TBS table, a transport block size corresponding to the SF for data transmission. For example, the TBS table may be Table 5 in which one SF corresponds to one TBS table. When obtaining a determined SF, the first device may find a corresponding TBS table, and then determine a transport block size through lookup.

TABLE 5

| TBS index ($I_{TBS}$) | $N_{PRB}$ 12 | | | |
|---|---|---|---|---|
| | $N_{Layer}$ | | | |
| | 1 | 2 | 4 | 6 |
| 0 | 4 | 8 | 16 | 24 |

In an optional embodiment, the TBS in the TBS table is determined according to a formula (33), $$TBS\_new = floor(TBS\_old * Layer/SF) \quad (33).$$

TBS_new represents the TBS in the TBS table, TBS_old represents an old TBS in an old TBS table, Layer represents the non-orthogonal layer quantity, and SF represents the spreading factor. For example, the old TBS table may be in a form of Table 2.

In an optional embodiment, before the determining, by the first device, the TBS in the TBS table based on the spreading factor and the non-orthogonal layer quantity, the method further includes determining, by the first device, an old TBS in an old TBS table, and determining, by the first device, the TBS in the TBS table according to a formula (33).

Specifically, there are three manners of determining the TBS table. In a first manner, the TBS table is formulated in advance, and the first device stores the formulated TBS table. For example, Table 4 may be a formulated TBS table, and the TBS table may be formulated by referring to the method provided in this embodiment of this application, or the TBS table may be formulated based on another predetermined rule or requirement. In a second manner, the TBS table is determined based on the formula (33), and the TBS table is stored for direct lookup. In a third manner, the TBS in the TBS table is determined based on the formula (33). A stored TBS table is still an old TBS table, and when the TBS needs to be determined through lookup, the TBS table in this embodiment of this application is calculated according to the formula (33) by using the TBS in the old TBS table, and then the TBS is obtained through lookup in the TBS table. For example, the calculated TBS table may be in a form of Table 6 in which a plurality of SFs correspond to one TBS table. A TBS in the TBS table is related to a non-orthogonal layer quantity. The first device may determine the TBS table when needing to determine the TBS, or the first device has the TBS table before determining the TBS. In Table 6, TBS_L1=16 is the TBS in the old TBS table. For example, Table 2 may be the old TBS table. In Table 2, when $I_{TBS}$ is 0 and $N_{PRB}$ is 1, the TBS is 16, that is, TBS_L1=16. In Table 6, TBS_1L on the left is a TBS when the non-orthogonal layer quantity is 1 and the SF is 4. The TBS may be calculated based on the formula (33). Specifically, TBS_1L=floor(TBS_old*Layer/SF)=floor(16*1/4)=4. In Table 6, TBS_2L on the left is a TBS when the non-orthogonal layer quantity is 2 and the SF is 4. The TBS may be calculated based on the formula (33). Specifically, TBS_2L=floor(TBS_old*Layer/SF)=floor(16*2/4)=8. By analogy, the transport block size in Table 6 can be obtained.

TABLE 6

| | SF = 4 | | | | SF = 8 | | | |
|---|---|---|---|---|---|---|---|---|
| TBS_L1 | TBS_1L | TBS_2L | TBS_4L | TBS_6L | TBS_1L | TBS_2L | TBS_4L | TBS_6L |
| 16 | 4 | 8 | 16 | 24 | 2 | 4 | 8 | 16 |

Optionally, the TBS table may be alternatively Table 7 in which one SF corresponds to one TBS table. A TBS in the TBS table is related to a non-orthogonal layer quantity. The first device may determine the TBS table when needing to determine the TBS, or the first device has the TBS table before determining the TBS. A calculation manner of a transport block size in Table 7 is the same as that in Table 6, and details are not described again in this embodiment of this application.

TABLE 7

| | SF = 4 | | | |
|---|---|---|---|---|
| TBS_L1 | TBS_1L | TBS_2L | TBS_4L | TBS_6L |
| 16 | 4 | 8 | 16 | 24 |

S230. The first device encodes data based on the non-orthogonal layer quantity and the TBS to obtain encoded data. Optionally, the first device may encode the data based on the TBS, the non-orthogonal layer quantity, the bandwidth, and the modulation order to obtain the encoded data.

S240. The first device sends the encoded data to a second device.

In an optional embodiment, before S240, the method 200 further includes determining, by the first device, a non-orthogonal layer, and S240 includes sending, by the first device, the encoded data to the second device based on the non-orthogonal layer.

In an optional embodiment, the determining, by the first device, a non-orthogonal layer includes determining, by the first device, a non-orthogonal start layer number, and determining, by the first device, the non-orthogonal layer based on the non-orthogonal start layer number and the non-orthogonal layer quantity.

For example, the non-orthogonal layer may be determined based on the non-orthogonal start layer number, and the non-orthogonal layer quantity in Table 1. As an example, it is assumed that the first device determines that the non-orthogonal start layer number is 2 and an MCS index that is received by the first device and that is sent by the second device is 1. Then, it is determined, based on Table 1, that a non-orthogonal layer quantity corresponding to the MCS index which is 1 is 2. Therefore, the first device determines that non-orthogonal layers are the second layer and the third layer. Then, data is transmitted based on the non-orthogonal layers, the second layer and the third layer. Different non-orthogonal layers may correspond to different codebooks, signature sequences, or spreading sequences. For example, in SCMA, different non-orthogonal layers correspond to different SCMA codebooks, in PDMA, different non-orthogonal layers correspond to different signature sequences, and in MUSA, different non-orthogonal layers correspond to different spreading sequences. Optionally, the non-orthogonal layer may be alternatively determined based on the non-orthogonal start layer number, the non-orthogonal layer quantity, and a non-orthogonal layer interval. For example, if the non-orthogonal start layer number is 1, the non-orthogonal layer quantity is 3, and the non-orthogonal layer interval is 2, non-orthogonal layers are the first layer, the third layer, and the fifth layer. How to determine the non-orthogonal layer is not limited in this embodiment of this application.

In an optional embodiment, the method includes receiving, by the first device, the non-orthogonal start layer number sent by the second device.

In an optional embodiment, the determining, by the first device, a non-orthogonal start layer number includes determining, by the first device, the non-orthogonal start layer number in the MCS table.

In an optional embodiment, the determining, by the first device, a non-orthogonal start layer number includes determining, by the first device, the non-orthogonal start layer number in the TBS table.

Specifically, the first device may determine the non-orthogonal layer in three manners. In a first manner, the first device is a terminal device, the first device receives a non-orthogonal layer quantity and a non-orthogonal start layer number that are sent by a network device, and the first device determines the non-orthogonal layer based on the received non-orthogonal layer quantity and non-orthogonal start layer number. In a second manner, the first device receives a non-orthogonal start layer number sent by a second device, and the first device determines a non-orthogonal layer quantity based on an MCS table and determines the non-orthogonal layer based on the non-orthogonal start layer number and the non-orthogonal layer quantity. In a third manner, the first device determines a non-orthogonal layer quantity and a non-orthogonal start layer number based on an MCS table. For example, the MCS table includes the non-orthogonal start layer number and the non-orthogonal layer quantity, as shown in Table 8. Then, the first device determines the non-orthogonal layer based on the non-orthogonal layer quantity and the non-orthogonal start layer number.

TABLE 8

| MCS index ($I_{MCS}$) | Modulation order ($Q_m$) | Non-orthogonal quantity (#Layer) | Non-orthogonal start layer number | TBS index ($I_{TBS}$) |
|---|---|---|---|---|
| 0 | 4 | 1 | 1 | 0 |
| 1 | 4 | 2 | 2 | 1 |
| 2 | 4 | 4 | 1 | 2 |
| 3 | 4 | 6 | 2 | 3 |
| 4 | 8 | 2 | 3 | 4 |
| 5 | 8 | 4 | 3 | 5 |

Before the sending, by the first device, the encoded data to a second device, the method 200 further includes determining, by the first device, a power offset, and the sending, by the first device, the encoded data to a second device includes sending, by the first device, the encoded data to the second device based on the power offset. For example, when the first device is a terminal device, and the second device is a network device, a plurality of non-orthogonal layers may be allocated to one terminal device, or a plurality of non-orthogonal layers are allocated to different terminal devices, and the network device uses a same channel to send downlink data on the plurality of non-orthogonal layers. When receiving the data, the terminal device cannot distinguish, by using a phase, data sent to the terminal device. Therefore, the network device needs to notify each terminal device of a power offset of the terminal device. In this case, each terminal device can receive data based on the power offset of the terminal device.

There may be four manners for the first device to determine the power offset. In a first manner, the first device receives the power offset sent by the second device. In a second manner, the first device determines the power offset based on the MCS table, and for example, the MCS table includes the power offset. In a third manner, the first device determines the power offset based on the TBS table. In a fourth manner, the first device determines the power offset based on a bit rate and/or a modulation order.

For example, in the second manner, the MCS table may be in a form of Table 9. In Table 9, after obtaining an MCS index, the first device can find a modulation order, a non-orthogonal layer quantity, a power offset, and a TBS index that correspond to the MCS index. For example, when an MCS index obtained by the first device is 2, the first device finds through lookup in Table 9 that the modulation order is 4, the non-orthogonal layer quantity is 4, the power offset is 3.3 dB, and the TBS index is 2. When the first device is a terminal device, the terminal device may receive a non-orthogonal start layer number sent by the network device, that is 2, and the terminal device obtains, based on the non-orthogonal start layer number and the non-orthogonal layer quantity, that non-orthogonal layers are the second layer, the third layer, the fourth layer, and the fifth layer. Moreover, when the first device obtains the PO that is 3.3 dB, the first device may receive, at a power offset location of 3.3 dB, data sent by the network device.

TABLE 9

| MCS index ($I_{MCS}$) | Modulation order ($Q_m$) | Non-orthogonal layer quantity (#Layer) | PO(dB) | TBS index ($I_{TBS}$) |
|---|---|---|---|---|
| 0 | 4 | 1 | — | 0 |
| 1 | 4 | 2 | — | 1 |
| 2 | 4 | 4 | 3.3 | 2 |
| 3 | 4 | 6 | 3.6 | 3 |
| 4 | 8 | 2 | — | 4 |
| 5 | 8 | 4 | 5.4 | 5 |

It should be understood that, in this embodiment of this application, in the following several cases, the first device may be a terminal device, and the second device may be a network device. In a first case the first device has a capability of only receiving a power offset sent by the second device, and does not have a capability of sending a power offset to the second device. In a second case the first device has a capability of only receiving a non-orthogonal layer quantity sent by the second device, and does not have a capability of sending a non-orthogonal layer quantity to the second device. In a third case the first device has a capability of only receiving a non-orthogonal start layer number sent by the second device, and does not have a capability of sending a non-orthogonal start layer number to the second device. In a fourth case the first device has a capability of only receiving a spreading factor sent by the second device, and does not have a capability of sending a spreading factor to the second device. In addition to the several cases described above, in this embodiment of this application, the first device may be a terminal device or a network device, and the second device may be a terminal device or a network device.

In a possible implementation, each TBS in the TBS table may be calculated according to a formula, or the TBS may be directly obtained according to a formula without table lookup. For example, the formula for calculating the TBS may be a formula (10).

$$TBS = N \cdot v \cdot Q \cdot R \quad (10)$$

v represents a spatial layer quantity, also referred to as a spatial flow quantity, and may be, for example, a spatial flow quantity in a multiple-input multiple-output system, Q represents a modulation order, R represents a bit rate, and N represents a quantity of resource elements that are in an allocated physical resource block (physical resource block, PRB) and that can be used to transmit data. For example, N may be obtained according to the following formulas (11) to (13).

$$X = 12 * M - X_d - X_{oh} \quad (11)$$

$$Y = f(X) \quad (12)$$

$$N = Y \cdot N_{PRB} \quad (13)$$

M represents a quantity of orthogonal frequency division multiplexing (orthogonal frequency division multiplexing, OFDM) symbols for sending data, that is, 12*M represents a total quantity of resource elements that are in a PRB and that are used to send data. $X_d$ represents a quantity of resource elements occupied by a data demodulation reference signal (demodulation reference signal, DMRS) in each PRB. $X_{oh}$ represents an overhead other than that of the DMRS in each PRB. The overhead may be a quantity of resource elements not used in data transmission other than the quantity of resource elements of the DMRS. For example, the overhead may be a quantity of resource elements occupied by a channel state information-reference signal (channel state information-reference signal, CSI-RS) and/or a quantity of resource elements occupied by a control resource set (control resource set, CORESET). That is, X represents a quantity of resource elements that are in each PRB and that can transmit data. f(·) represents a quantization function, that is, X is quantized to obtain Y. For example, a specific quantization process is shown in Table 10. For example, when a value of X is greater than 9 and less than or equal to 15, a value of Y is 12. Optionally, X may not be quantized, that is, Y=X. For example, Y may be eight preset candidate values. $N_{PRB}$ represents a quantity of allocated physical resource blocks (resource block, RB). Assuming that the TBS is calculated by using the foregoing formula (4), in an encoding process, the bit rate is equal to the TBS divided by a channel coding length, and the channel coding length is a product of a quantity N of resource elements that are in the allocated physical resources and that are used to transmit data, a spatial layer quantity v, and a modulation order Q.

TABLE 10

| X | Y |
|---|---|
| X ≤ 9 | 6 |
| 9 < X ≤ 15 | 12 |
| 15 < X ≤ 30 | 18 |
| 30 < X ≤ 57 | 42 |
| 57 < X ≤ 90 | 72 |
| 90 < X ≤ 126 | 108 |
| 126 < X ≤ 150 | 144 |
| 150 < X | 156 |

For the SCMA technology, one of the non-orthogonal multiple access technology, two modulated symbols may be mapped to four resource elements. The modulated symbols are mapped to two resource elements, and o elements are on the other two resource elements, that is, one resource mapping unit includes four resource elements. A quantity of modulated symbols is less than a quantity of resource elements included in a resource mapping unit. In other words, when a quantity of available resource elements remains unchanged, modulated symbols that can be used for transmission are reduced. For example, a total quantity of available REs is 100, and if a QPSK modulation scheme is used, 200 bits may be mapped to 100 REs. If the TBS is 50 bits, the bit rate is 0.25(50/200), and sparse mapping exists, two modulated symbols need to be mapped to four REs, and then only 50 modulated symbols can be mapped to 100 REs. If the QPSK modulation scheme is used, 100 bit data can be mapped to 100 REs. To ensure that the bit rate is unchanged and is still 0.25, in this case, an actual TBS size needs to change, for example, needs to change to 25 bits (100*0.25) rather than 50 bits. Therefore, in a case of sparse mapping or spreading, how to calculate an actual TBS is a problem to be resolved urgently. In addition to the SCMA technology, other non-orthogonal multiple access technologies also have the same problem.

For the foregoing problem, this embodiment of this application provides a method of calculating a TBS based on a first parameter, where the first parameter is a quantity of resource elements included in a resource mapping unit. In this way, the TBS is calculated based on the quantity of REs actually included in one resource mapping unit, thereby helping improve accuracy of determining the TBS and improve data transmission performance.

Figure 3:
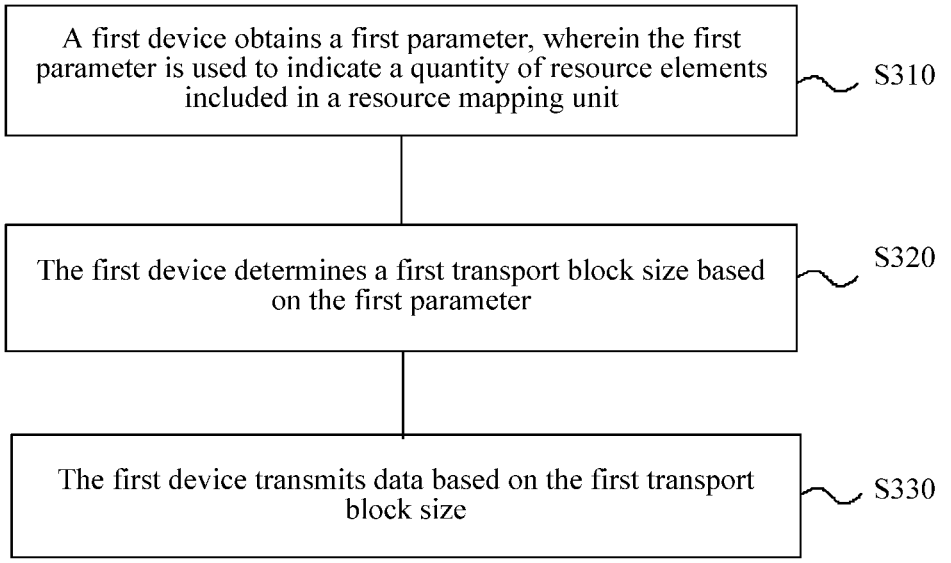
FIG. 3 is a schematic diagram of another data transmission method according to an embodiment of this application.

FIG. 3 shows a data transmission method 300 according to an embodiment of this application. The method 300 includes the following steps.

S310. A first device obtains a first parameter, where the first parameter is used to indicate a quantity of resource elements included in a resource mapping unit.

A resource mapping unit includes a resource element carrying a set of bits, and a bit quantity of the set of bits is a modulation order Q. For example, in an OFDM technology, one modulated symbol obtained by modulating Q bits are mapped to one RE (that is, the RE carries the Q bits), so that the resource mapping unit includes one resource element, and the first parameter is 1. In a sparse code multiple access SCMA technology, two modulated symbols obtained by modulating Q bits are sparsely mapped to four REs (that is, the four REs carry the Q bits), so that the resource mapping unit includes four resource elements, and the first parameter is 4. For another example, in a multi-user shared access (MUSA) technology, one modulated symbol obtained by modulating Q bits is spread and then mapped to four REs (that is, the four REs carry the Q bits), so that the resource mapping unit includes four REs, and the first parameter is 4. For another example, for interleave grid multiple access (interleave grid multiple access, IGMA), one modulated symbol obtained by modulating Q bits is sparsely mapped to four REs (that is, the four REs carry the Q bits), so that the resource mapping unit includes four REs, and the first parameter is 4. For another example, in a pattern division multiple access (PDMA) technology, one modulated symbol obtained by modulating Q bits is sparsely spread and then mapped to three REs, so that the resource mapping unit includes three REs, and the first parameter is 3.

In an optional embodiment, assuming that the first device is a terminal device, S310 includes obtaining, by the first device, the first parameter by using radio resource control (RRC) signaling or downlink control information that are sent by a network device. Optionally, the first device may alternatively obtain the first parameter by using media access control (MAC) layer control element (CE) signaling sent by the network device.

In an optional embodiment, S310 includes obtaining, by the first device, the first parameter by using a multiple access signature MAS. For example, the MAS includes an SCMA codebook (or a code word), a sequence, an interleaver pattern, and a mapping pattern. Optionally, the first device may determine the first parameter based on a channel condition and/or a data buffer size. For example, when the channel condition is relatively poor and/or the data buffer size is relatively small, the first device may select a relatively large value from preset values as the first parameter, or when the channel condition is relatively desirable and/or the data buffer size is relatively large, the first device may select a relatively small value from preset values as the first parameter.

In an optional embodiment, S310 includes obtaining, by the first device, the first parameter by using a preprocessed matrix. In an embodiment, the preprocessed matrix is a matrix having F rows and L columns. An element of the matrix may be a complex number or a real number, and the first parameter is a quantity of rows of the preprocessed matrix. In an optional embodiment, the preprocessed matrix is a matrix having L rows and F columns. An element of the matrix may be a complex number or a real number, and the first parameter is a quantity of columns of the preprocessed matrix. Optionally, a function of the preprocessed matrix is to preprocess a modulated symbol obtained after spatial layer mapping, and the preprocessing is specifically Y=W*X. X represents an input of the preprocessing, Y represents an output of the preprocessing, and W represents the preprocessed matrix. The preprocessing operation is performed before a precoding operation.

In an optional embodiment, the first device may obtain F based on downlink control information, radio resource control signaling, or an MAS. For example, F is equal to a length of the multiple access signature (for example, a quantity of symbols included in code words of a codebook, a sequence length, and an interleaver pattern length).

S320. The first device determines a first transport block size based on the first parameter.

How to determine the first transport block size based on the first parameter is described in detail below in two cases. In a first case, the first transport block size is determined based on the first parameter. In a second case, the first transport block size is determined based on the first parameter and a non-orthogonal layer quantity. The second case has two scenarios. In a first scenario, there may be a plurality of non-orthogonal layers on each spatial layer, and the spatial layer includes a same non-orthogonal layer quantity. In a second scenario, there may be a plurality of non-orthogonal layers on each spatial layer, and the spatial layer may include a same non-orthogonal layer quantity or different non-orthogonal layer quantities. In this embodiment of this application, when the first transport block size is determined, the non-orthogonal layer quantity is considered, so that accuracy of determining a transport block size can be improved. For example, in a non-orthogonal multiple access technology, if there are two non-orthogonal layers, and the two non-orthogonal layers are not considered when the transport block size is calculated, the transport block size is calculated as p, but actually, there are two non-orthogonal layers, and 2p of data can be simultaneously transmitted. In this way, if the non-orthogonal layer quantity is not considered, data to be transmitted is reduced, causing waste of some resources. Therefore, the non-orthogonal layer quantity is introduced when the transport block size is introduced, to help reduce resource waste and improve accuracy of calculating the transport block size.

In the first case, in an optional embodiment, the method 300 further includes obtaining, by the first device, a quantity (N) of resource elements that are in an allocated physical resource and that are used to transmit data, a spatial layer quantity (v), a modulation order (Q), and a bit rate (R), and S320 includes determining, by the first device, the first transport block size based on the quantity of resource elements that are in the allocated physical resource and that are used to transmit data, the spatial layer quantity, the modulation order, the bit rate, and the first parameter.

For example, the first transport block size may be determined according to any one of formulas (1), (2), and (3).

$$\text{TBS}=N\cdot v\cdot Q\cdot R/F \quad (1)$$

$$\text{TBS}=\text{floor}(N\cdot v\cdot Q\cdot R/F) \quad (2)$$

$$\text{TBS}=\text{ceil}(N\cdot v\cdot Q\cdot R/F) \quad (3)$$

TBS represents the first transport block size, N represents the quantity of resource elements that are in the allocated physical resource and that are used to transmit data, v represents the spatial layer quantity, Q represents the modulation order, R represents the bit rate, F represents the first parameter, floor(·) represents rounding down, and ceil(·) represents rounding up.

Optionally, the first device may determine the quantity N of resource elements that are in the allocated physical resource and that are used to transmit data, the spatial layer quantity, the modulation order, the bit rate and the like based on the downlink control information or the radio resource control signaling.

In the first case, in an optional embodiment, in this embodiment of this application, a quantity $N_1$ of equivalent resource elements that are in the allocated physical resource and that are used to transmit data may be determined based on the first parameter F, for example, $N_1=N/F$. $N_1$ represents the quantity of equivalent resource elements that are in the allocated physical resource and that are used to transmit data, and N represents a quantity of actual resource elements that are in the allocated physical resource and that are used to transmit data. That is, in a process of calculating the first transport block size, the TBS may be calculated directly by using the quantity $N_1$ of equivalent resource elements. For example, the TBS is calculated according to formulas (14) to (16), or the TBS may be obtained in other quantization manners than rounding up and rounding down. This is not limited in this embodiment of this application.

$$\text{TBS}=N_1\cdot v\cdot Q\cdot R \quad (14)$$

$$\text{TBS}=\text{floor}(N_1\cdot v\cdot Q\cdot R) \quad (15)$$

$$\text{TBS}=\text{ceil}(N_1\cdot v\cdot Q\cdot R) \quad (16)$$

In the first case, in an optional embodiment, an equivalent bit rate $R_1$ may be determined by using the first parameter F, for example, $R_1=R/F$. $R_1$ represents the equivalent bit rate, and R represents an actual bit rate. That is, in a process of calculating the first transport block size, the TBS may be calculated directly by using the equivalent bit rate $R_1$. For example, the TBS is calculated according to formulas (17) to (19), or the TBS may be obtained in other quantization manners than rounding up and rounding down. This is not limited in this embodiment of this application.

$$\text{TBS}=N\cdot v\cdot Q\cdot R_1 \quad (17)$$

$$\text{TBS}=\text{floor}(N\cdot v\cdot Q\cdot R_1) \quad (18)$$

$$\text{TBS}=\text{ceil}(N\cdot v\cdot Q\cdot R_1) \quad (19)$$

In the first scenario of the second case, each of spatial layers includes a same non-orthogonal layer quantity, for example, each spatial layer includes L non-orthogonal layers, and the determining, by the first device, the first transport block size based on the quantity of resource elements that are in the allocated physical resource and that are used to transmit data, the spatial layer quantity, the modulation order, the bit rate, the first parameter, and the non-orthogonal layer quantity corresponding to each spatial layer includes determining, by the first device, the first transport block size according to any one of formulas (4), (5), and (6).

$$\text{TBS}=N\cdot v\cdot Q\cdot R\cdot L/F \quad (4)$$

$$\text{TBS}=\text{floor}(N\cdot v\cdot Q\cdot R\cdot L/F) \quad (5)$$

$$\text{TBS}=\text{ceil}(N\cdot v\cdot Q\cdot R\cdot L/F) \quad (6)$$

L represents a non-orthogonal layer quantity corresponding to each spatial layer, and physical meanings of other parameters are the same as the foregoing description.

In an optional embodiment, assuming that the first device is a terminal device, the first device obtains L by using radio resource control (radio resource control, RRC) signaling or downlink control information sent by a network device.

Optionally, the first device may alternatively obtain L by using media access control (media access control, MAC) layer control element (control element, CE) signaling sent by the network device. Optionally, the first device may determine L based on a channel condition and/or a data buffer size. For example, when the channel condition is relatively poor and/or the data buffer size is relatively small, the first device may select a relatively small value from preset values as L, or when the channel condition is relatively desirable and/or the data buffer size is relatively large, the first device may select a relatively large value from preset values as L.

In an optional embodiment, the first device obtains L by using a preprocessed matrix. In an optional embodiment, the preprocessed matrix is a matrix having F rows and L columns. An element of the matrix may be a complex number or a real number, and L is a quantity of columns of the preprocessed matrix. In an optional embodiment, the preprocessed matrix is a matrix having L rows and F columns. An element of the matrix may be a complex number or a real number, and L is a quantity of columns of the preprocessed matrix. That is, each of V spatial layers corresponds to a same quantity of rows or columns of the preprocessed matrix.

Figure 4:
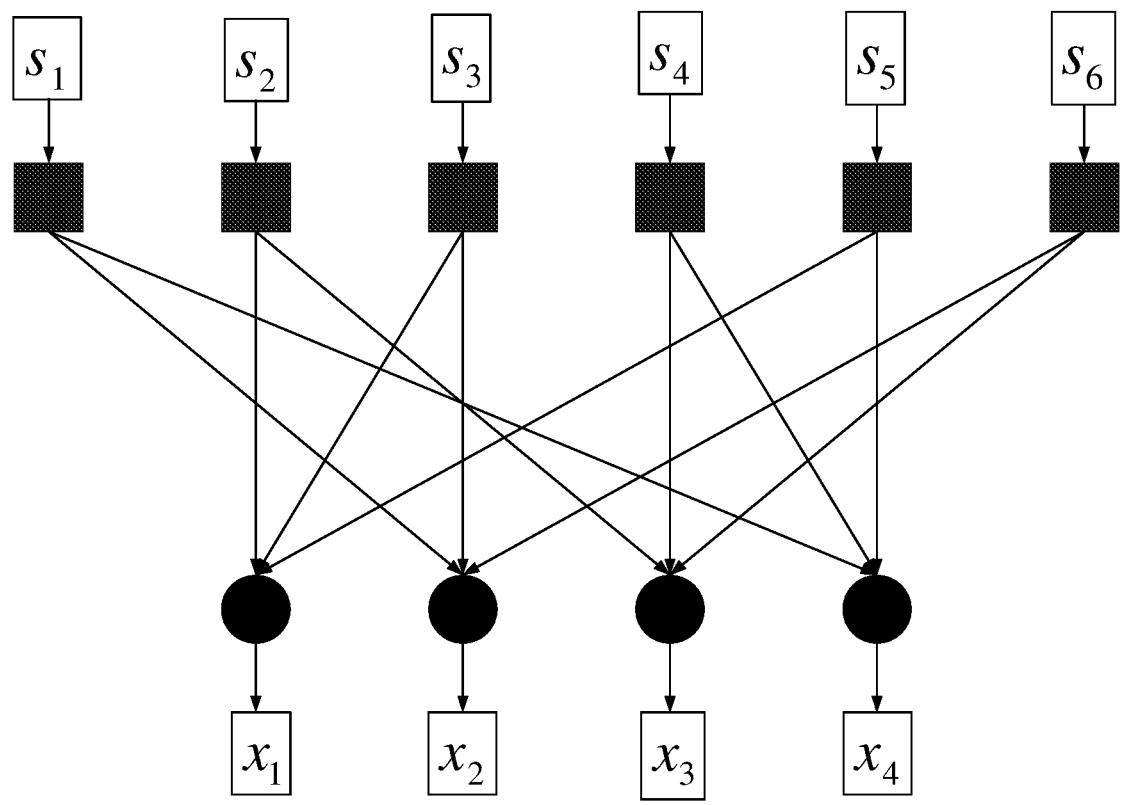
FIG. 4 is a schematic diagram of a non-orthogonal layer quantity according to an embodiment of this application.

The following explains a concept of the non-orthogonal layer quantity in the SCMA technology with reference to FIG. 4. As shown in FIG. 4, $s_1$, $s_2$, $s_3$, $s_4$, $s_5$, and $s_6$ represent six variable nodes. Each variable node corresponds to one non-orthogonal layer, and each variable node is used to send a data flow of a user. The user may have one data flow, or more than one data flow. $x_1$, $x_2$, $x_3$, and $x_4$ represent four functional nodes, and each functional node is equivalent to a subcarrier or a resource element represented by the functional node. A connecting line between the variable node and the functional node indicates that after data of the variable node is spread, non-zero symbols are sent on the functional node. It can be learned from FIG. 3 that, after data of each variable node is spread, data is sent on a plurality of functional nodes, and data sent on each functional node is superimposed symbols after the data from the plurality of variable nodes are spread. For example, after data of the variable node $s_3$ is spread, non-zero symbols are sent on the functional nodes $x_1$ and $x_2$, and data sent by the functional node $x_3$ is superimposed non-zero symbols obtained after the variable nodes $s_2$, $s_4$, and $s_6$ are spread. More specifically, assuming that the access variable nodes $s_1$ and $s_2$ are from a user 1, and $s_3$ and $s_4$ are from a user 2, $s_5$ and $s_6$ are from a user 3, in the SCMA technology, the user 1, the user 2, and the user 3 use a same time frequency resource for non-orthogonal transmission. In this case, one user uses two non-orthogonal layers. In this embodiment of this application, when data is sent on a plurality of non-orthogonal layers, how many non-orthogonal layers are used needs to be learned of. In this case, in a TBS calculation process, the user may consider the non-orthogonal layer quantity, so that it is ensured that when the user uses a non-orthogonal multiple access technology, data can be reliably transmitted. In other non-orthogonal multiple access technologies, concepts of the non-orthogonal layer quantity are similar. To avoid repetition, details are not described herein again.

In the first scenario of the second case, in this embodiment of this application, a quantity $N_2$ of equivalent resource elements that are in the allocated physical resource and that are used to transmit data may be determined by using the first parameter F and the non-orthogonal layer quantity L that corresponds to each spatial layer, for example, $N_2=N \cdot L/F \cdot N_2$ represents the quantity of equivalent resource elements that are in the allocated physical resource and that are used to transmit data, and N represents a quantity of actual resource elements that are in the allocated physical resource and that are used to transmit data. That is, in a process of calculating the first transport block size, the TBS may be calculated directly by using the quantity $N_2$ of equivalent resource elements. For example, the TBS is calculated according to formulas (20) to (22), or the TBS may be obtained in other quantization manners than rounding up and rounding down. This is not limited in this embodiment of this application.

$$TBS = N_2 \cdot v \cdot Q \cdot R \quad (20)$$

$$TBS = \text{floor}(N_2 \cdot v \cdot Q \cdot R) \quad (21)$$

$$TBS = \text{ceil}(N_2 \cdot v \cdot Q \cdot R) \quad (22)$$

In the first scenario of the second case, in this embodiment of this application, an equivalent bit rate $R_2$ may be determined by using the first parameter F and the non-orthogonal layer quantity L that corresponds to each spatial layer, for example, $R_2 = R \cdot L/F \cdot R_2$ represents the equivalent bit rate, and R represents an actual bit rate. That is, in a process of calculating the first transport block size, the TBS may be calculated directly by using the equivalent bit rate $R_2$. For example, the TBS is calculated according to formulas (23) to (25), or the TBS may be obtained in other quantization manners than rounding up and rounding down. This is not limited in this embodiment of this application.

$$TBS = N \cdot v \cdot Q \cdot R_2 \quad (23)$$

$$TBS = \text{floor}(N \cdot v \cdot Q \cdot R_2) \quad (24)$$

$$TBS = \text{ceil}(N \cdot v \cdot Q \cdot R_2) \quad (25)$$

In the second scenario of the second case, each of spatial layers includes a same non-orthogonal layer quantity or different non-orthogonal layer quantities, for example, an $i^{th}$ spatial layer includes $L_i$ non-orthogonal layers, and the determining, by the first device, the first transport block size based on the quantity of resource elements that are in the allocated physical resource and that are used to transmit data, the spatial layer quantity, the modulation order, the bit rate, the first parameter, and the non-orthogonal layer quantity corresponding to each spatial layer includes determining, by the first device, the first transport block size according to any one of formulas (7), (8), and (9).

$$TBS = N \cdot Q \cdot R \cdot \Sigma_{i=1}^{v} L_i \cdot v/(F \cdot v) = N \cdot Q \cdot R \cdot \Sigma_{i=1}^{v} L_i/F \quad (7)$$

$$TBS = \text{floor}(N \cdot Q \cdot R \cdot \Sigma_{i=1}^{v} L_i \cdot v/(F \cdot v)) = \text{floor}(N \cdot Q \cdot R \cdot \Sigma_{i=1}^{v} L_i/F) \quad (8)$$

$$TBS = \text{ceil}(N \cdot Q \cdot R \cdot \Sigma_{i=1}^{v} L_i \cdot v/(F \cdot v)) = \text{ceil}(N \cdot Q \cdot R \cdot \Sigma_{i=1}^{v} L_i/F) \quad (9)$$

v represents the spatial layer quantity, $L_i$ represents a non-orthogonal layer quantity corresponding to the $i^{th}$ spatial layer, and physical meanings of other parameters are the same as the foregoing description. For example, the first device may determine the non-orthogonal layer quantity $L_i$ corresponding to the $i^{th}$ spatial layer based on that the non-orthogonal layer quantity $L_i$ corresponding to the $i^{th}$ spatial layer is equal to a quantity of multiple access signatures used by the first device when sending data on the spatial layer.

In an optional embodiment, assuming that the first device is a terminal device, the first device obtains $L_i$ by using RRC signaling or downlink control information sent by a network device. Optionally, the first device may obtain $L_i$ by using MAC CE signaling sent by the network device.

In an optional embodiment, the first device obtains $L_i$ by using a preprocessed matrix. In an optional embodiment, the preprocessed matrix is a matrix having F rows and $L_i$ columns. An element of the matrix may be a complex number or a real number, and $L_i$ is a quantity of columns of the preprocessed matrix. In another embodiment, the preprocessed matrix is a matrix having $L_i$ rows and F columns. An element of the matrix may be a complex number or a real number, and $L_i$ is a quantity of columns of the preprocessed matrix. That is, one spatial layer may correspond to one preprocessed matrix, and $L_i$ may be determined based on the row or column of the preprocessed matrix corresponding to each spatial layer.

In the second scenario of the second case, in an optional embodiment, a quantity $N_3$ of equivalent resource elements that are in the allocated physical resource and that are used to transmit data may be determined by using the first parameter F and the non-orthogonal layer quantity $L_i$ that corresponds to the $i^{th}$ spatial layer, for example, $N_3 = N \cdot \Sigma_{i=1}'L_i/(F \cdot v) \cdot N_3$ represents the quantity of equivalent resource elements that are in the allocated physical resource and that are used to transmit data, and N represents a quantity of actual resource elements that are in the allocated physical resource and that are used to transmit data. That is, in a process of calculating the first transport block size, the TBS may be calculated directly by using the quantity $N_3$ of equivalent resource elements. For example, the TBS is calculated according to formulas (26) to (28), or the TBS may be obtained in other quantization manners than rounding up and rounding down. This is not limited in this embodiment of this application.

$$\text{TBS} = N_3 \cdot v \cdot Q \cdot R \quad (26)$$

$$\text{TBS} = \text{floor}(N_3 \cdot v \cdot Q \cdot R) \quad (27)$$

$$\text{TBS} = \text{ceil}(N_3 \cdot v \cdot Q \cdot R) \quad (28)$$

In the second scenario of the second case, in an optional embodiment, an equivalent bit rate $R_3$ may be determined by using the first parameter F and the non-orthogonal layer quantity $L_i$ that corresponds to the $i^{th}$ spatial layer, for example, $R_3 = R \cdot \Sigma_{i=1}'L_i/(F \cdot v) \cdot R_3$ represents the equivalent bit rate, and R represents an actual bit rate. That is, in a process of calculating the first transport block size, the TBS may be calculated directly by using the equivalent bit rate $R_3$. For example, the TBS is calculated according to formulas (29) to (31), or the TBS may be obtained in other quantization manners than rounding up and rounding down. This is not limited in this embodiment of this application.

$$\text{TBS} = N \cdot v \cdot Q \cdot R_3 \quad (29)$$

$$\text{TBS} = \text{floor}(N \cdot v \cdot Q \cdot R_3) \quad (30)$$

$$\text{TBS} = \text{ceil}(N \cdot v \cdot Q \cdot R_3) \quad (31)$$

S330. The first device transmits data based on the first transport block size.

Optionally, S330 includes performing, by the first device, a first operation on the first transport block size to obtain a second transport block size, and transmitting, by the first device, the data by using the second transport block size. Optionally, the first operation may be a rounding-up operation or a rounding-down operation. It should be understood that, the first operation may be alternatively other quantization operations than rounding up and rounding down. This is not limited in this embodiment of this application.

Specifically, the first device may perform encoding based on the first transport block size to obtain encoded data, and then transmit the encoded data on a corresponding transmission resource.

It should be understood that, the first device in this embodiment of this application may be a sending device or may be a receiving device. For example, the first device may be a terminal device, or may be a network device. This is not limited in this embodiment of this application.

It should also be understood that, the parameters such as the spatial layer quantity v, the modulation order Q, the bit rate R, and the first parameter F in the foregoing formula (1) to the formula (31) may be obtained in a preset manner or a network-configured manner. For example, the modulation order Q and the bit rate R may be obtained based on an MCS index delivered by the network device. An obtaining manner of each parameter is not limited in this embodiment of this application.

Therefore, in this embodiment of this application, the first transport block size can be determined based on the quantity of REs included in one resource mapping unit. In this way, it is helpful to improve accuracy of determining a transport block size and improve system performance.

The following describes a data processing method in the embodiments of this application in detail with reference to FIG. 5 to FIG. 10.

Before transmitting data, a first device first needs to determine a manner used for calculating a transport block size, for example, determine which one of the formula (10), and the formulas (1) to (9) is used by the first device to calculate the transport block size. Assuming that the first device is a terminal device, optionally, the first device may receive indication information sent by a network device, and the indication information is used to indicate a manner of calculating the transport block size. For example, RRC signaling, downlink control information, or a MAC CE may carry the indication information. Optionally, the first device may alternatively determine, based on a current channel condition or a data buffer size, which manner is used to calculate the transport block size. For example, when the user channel condition is relatively poor and/or the data buffer size is relatively small, the solution formula (10) may be selected to calculate the TBS, or when the channel condition is desirable and/or the data buffer size is relatively large, any one of the formula (1) to the formula (9) may be selected to calculate the TBS, and the determined manner of calculating the transport block size is indicated to the network device.

In an optional embodiment, the first device may determine an actual bit rate by using the first parameter and/or the non-orthogonal layer quantity, to perform rate matching based on the actual bit rate. Examples are as follows.

It is assumed that the formula (10) is used by the first device to determine the transport block size. It is assumed that there is sparse mapping or spreading, which is equivalent that a quantity of modulated symbols that can be actually used in transmission changes. L can increase the quantity of modulated symbols that can be actually used in transmission, and F decreases the quantity of modulated symbols that can be actually used in transmission. That is equivalent that, a quantity of equivalent REs changes to L/F times or $\Sigma_{i=1}'L_i/(v \cdot F)$ times of an old one. Therefore, when the formula (10) is used to calculate the transport block size, it is equivalent that the actual bit rate is $R \cdot F/L(R \cdot (1/(L/F)))$ $(R \cdot (1/(L/F)))$ or $R \cdot v \cdot F/\Sigma_{i=1}'L_i(R(1/(\Sigma_{i=1}'L_i/(v \cdot F))))$. Therefore, in a rate matching process, matching may be performed based on the actual bit rate.

It is assumed that the formula (1) to the formula (3) are used by the first device to determine the transport block size. It is assumed that there is sparse mapping or spreading, which is equivalent that a quantity of modulated symbols that can be actually used in transmission changes. Because F is also considered when the transport block size is calculated, which is equivalent that a quantity of equivalent REs changes to L/F times or $\Sigma_{i=1}{}'L_i/(v\cdot F)$ times of an old one. Therefore, when the formula (1) is used to calculate the transport block size, it is equivalent that the actual bit rate is R/L(R/F)/(L/F) or $R\cdot v/\Sigma_{i=1}{}'L_i((R/F)/\Sigma_{i=1}{}'L_i/(v\cdot F))$, or the actual bit rate is $R_1\cdot F/L$, where $R_1=R/F$. Therefore, in a rate matching process, matching may be performed based on the actual bit rate.

Figure 5:
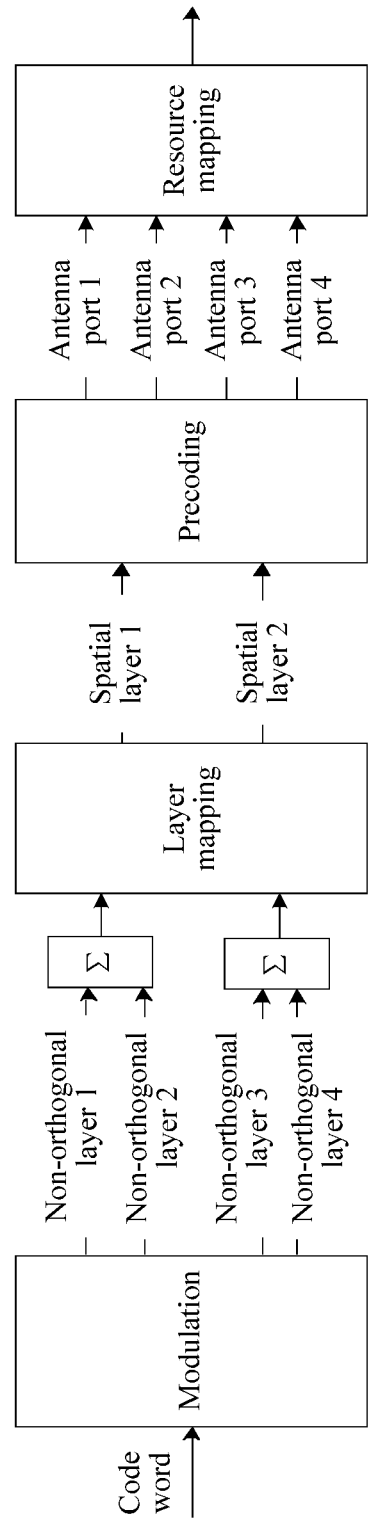
FIG. 5 is a schematic diagram of a data processing method according to an embodiment of this application.

FIG. 5 shows a data processing method according to an embodiment of this application. After a code word is processed, the processed code word, namely, data, is sent.

Step 1. A first device first maps a code word to a modulated symbol. A commonly used mapping manner includes a binary phase shift keying (BPSK) modulation mode, a quadrature phase shift keying (QPSK) modulation mode, 16 quadrature amplitude modulation (QAM), 64 QAM, 256 QAM, and the like. Optionally, a code word may be scrambled or interleaved to generate scrambled bits or interleaved bits, and then the scrambled bits or the interleaved bits are mapped as a modulated symbol. Scrambling is to perform an exclusive OR operation on bits in a code block by using a bit sequence, and the bit sequence has a length the same as a quantity of bits in the code block. Interweaving is to reorder bits in a code block. Generally, the step may use one of scrambling or interweaving, may use a combination of scrambling and interweaving which includes an operation of performing scrambling first and then performing interweaving or performing interweaving first and then performing scrambling, or may not use scrambling or interweaving. Optionally, the mapping process in step 1 includes a non-orthogonal multiple access operation in a non-orthogonal multiple access technology. The non-orthogonal multiple access operation is to map modulated symbols to a plurality of non-orthogonal layers. For example, the non-orthogonal multiple access operation may be directly mapping a set of bits to an n-dimensional complex vector, and n represents a quantity of resource elements included in a resource mapping unit. The non-orthogonal multiple access operation may be mapping a set of bits to modulated symbols less than or equal to n, and then sparsely mapping the modulated symbols less than or equal to n to one resource mapping unit. Alternatively, the non-orthogonal multiple access operation may be mapping a set of bits to a modulated symbol, and then multiplying the modulated symbol by a spreading sequence having a length of n, to obtain a symbol sequence having a length of n. Alternatively, the non-orthogonal multiple access operation may be mapping a set of bits to k modulated symbols, and then multiplying the k modulated symbols by a spreading matrix of k*n, to obtain a symbol sequence having a length of n. Alternatively, the non-orthogonal multiple access operation may be sparsely mapping modulated symbols less than or equal to n to one resource mapping unit.

Step 2. Add modulated symbols of a non-orthogonal layer corresponding to each spatial layer.

Step 3. Perform a layer mapping operation on a modulated symbol sequence obtained after the addition in step 2, and map the modulated symbol sequence to a corresponding spatial layer. The spatial layer mapping is usually used in a case of multi-antenna transmission. If the first device uses a single antenna in transmission, there is only one spatial layer at most.

Step 4. Perform precoding processing on the modulated symbols after the layer mapping, and map the modulated symbols on different spatial layers to different antenna ports. Assuming that there are v spatial layers and P antenna ports, corresponding precoding may be expressed as a formula (32). v is a precoding matrix, v has a size of Pv, $y^{(0)}(i)$, $y^{(1)}(i)$, ... $y^{(v-1)}(i)$ are modulated symbols of the V spatial layers, and $z^{(0)}(i)$, $z^{(1)}(i)$, ... $z^{(P-1)}(i)$ (are modulated symbol after the precoding.

$$\begin{bmatrix} z^{(0)}(i) \\ \cdots \\ z^{(P-1)}(i) \end{bmatrix} = V \begin{bmatrix} y^{(0)}(i) \\ \cdots \\ y^{(v-1)}(i) \end{bmatrix} \quad (32)$$

Step 5. Perform resource mapping on the modulated symbol after the precoding, map the modulated symbols to a plurality of REs, and send the REs.

Figure 6:
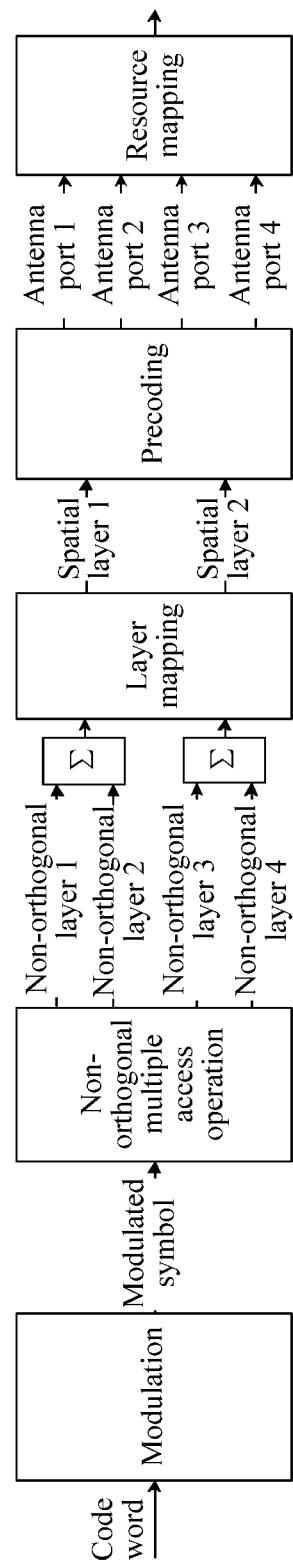
FIG. 6 is a schematic diagram of another data processing method according to an embodiment of this application.

FIG. 6 is a schematic diagram of another data processing method according to an embodiment of this application. After data is processed, the data is sent. Different from FIG. 5, a mapping process in step 1 does not include a non-orthogonal multiple access operation process, and the non-orthogonal multiple access operation is to map a modulated symbol to a plurality of non-orthogonal layers. That is, in FIG. 5, the non-orthogonal multiple access operation process is added between step 1 and step 2.

Figure 7:
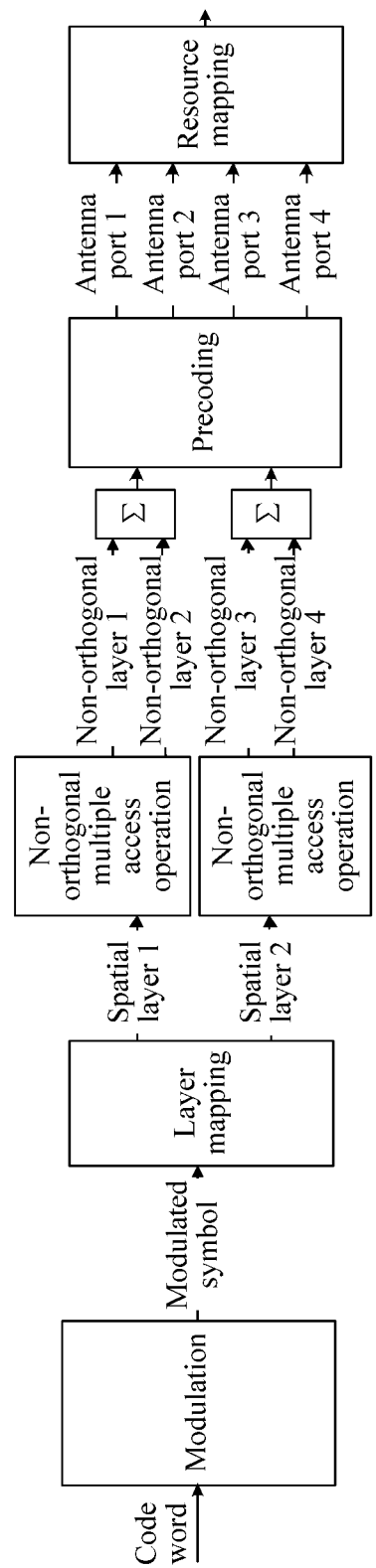
FIG. 7 is a schematic diagram of still another data processing method according to an embodiment of this application.

FIG. 7 is a schematic diagram of another data processing method according to an embodiment of this application. A non-orthogonal multiple access operation process is performed after layer mapping in FIG. 7 different from that in FIG. 6.

It should be understood that, in FIG. 5 to FIG. 7, each spatial layer includes a same quantity of non-orthogonal layers, namely, 2. That is, a spatial layer 1 includes two non-orthogonal layers, a non-orthogonal layer 1 and a non-orthogonal layer 2, and a spatial layer 2 includes two non-orthogonal layers, a non-orthogonal layer 3 and a non-orthogonal layer 4.

Figure 8:
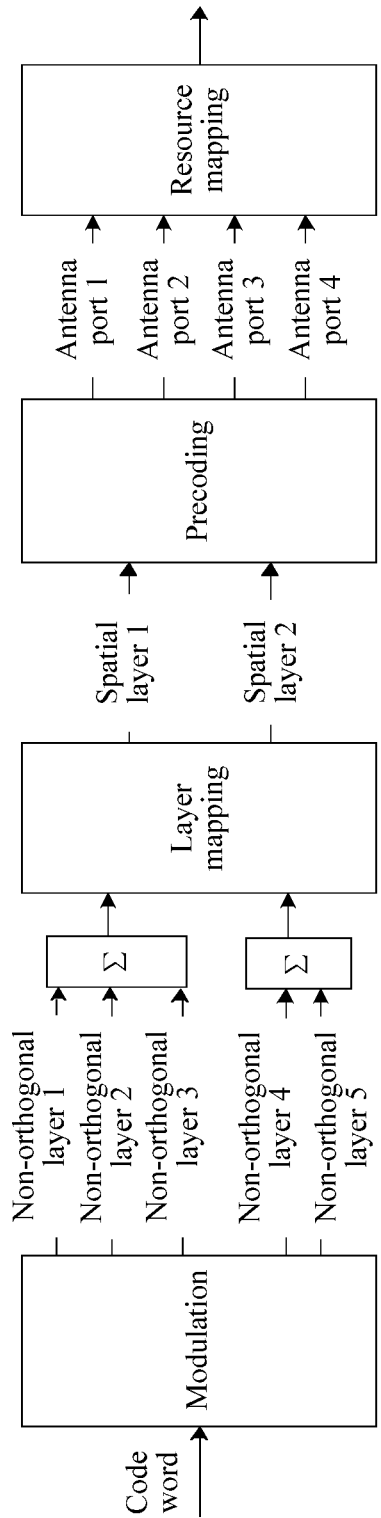
FIG. 8 is a schematic diagram of still another data processing method according to an embodiment of this application.
Figure 9:
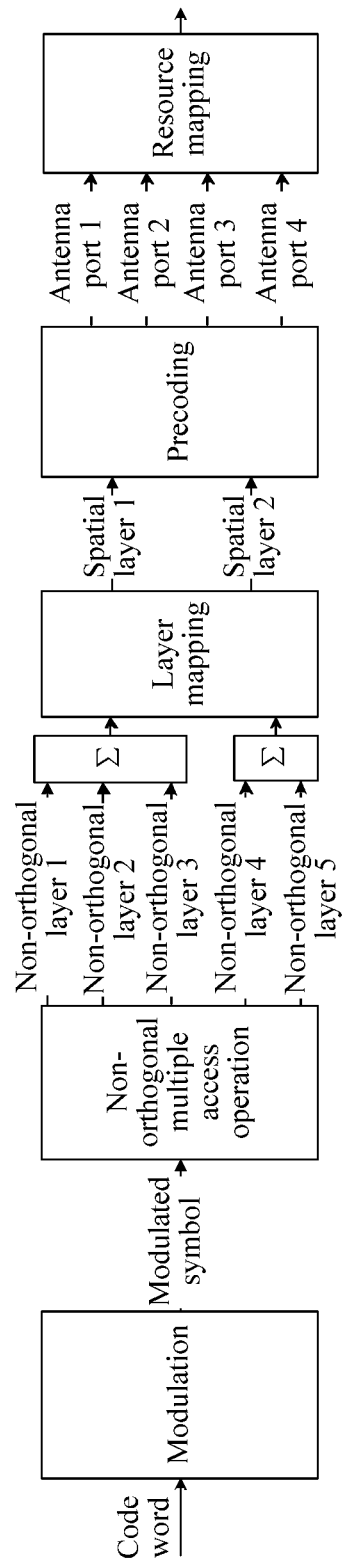
FIG. 9 is a schematic diagram of still another data processing method according to an embodiment of this application.
Figure 10:
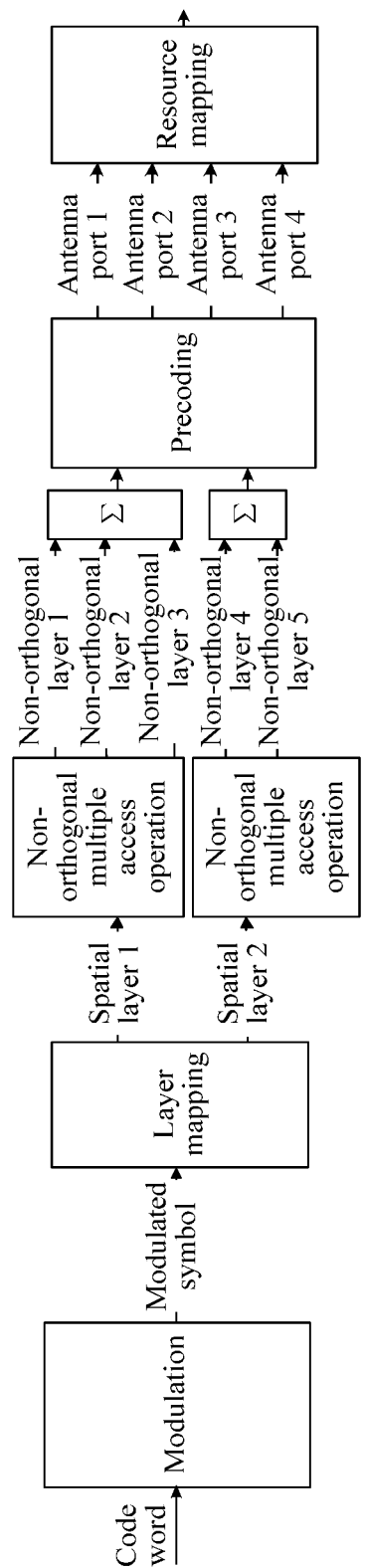
FIG. 10 is a schematic diagram of still another data processing method according to an embodiment of this application.

FIG. 8 to FIG. 10 are schematic diagrams of a data processing method according to an embodiment of this application. A difference between FIG. 8 and FIG. 5 lies in that, in FIG. 5, each spatial layer includes two non-orthogonal layers, and in FIG. 8, each spatial layer includes a different quantity of non-orthogonal layers. A spatial layer 1 includes three non-orthogonal layers, a non-orthogonal layer 1, a non-orthogonal layer 2, and a non-orthogonal layer 3, and a spatial layer 2 includes two non-orthogonal layers, a non-orthogonal layer 4 and a non-orthogonal layer 5. A difference between FIG. 9 and FIG. 6, a difference between FIG. 10 and FIG. 7, and a difference between FIG. 8 and FIG. 5 are the same, that is, each spatial layer includes a different quantity of non-orthogonal layers.

The data transmission method in the embodiments of this application is described in detail above with reference to FIG. 1 and FIG. 10, and the data transmission apparatus in the embodiments of this application is described in detail below with reference to FIG. 11 and FIG. 14.

Figure 11:
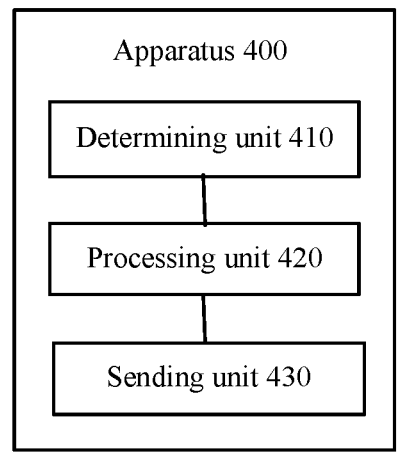
FIG. 11 is a schematic block diagram of a data transmission apparatus according to an embodiment of this application.

FIG. 11 shows a data transmission apparatus 400 according to an embodiment of this application. The apparatus 400 includes a determining unit 410, configured to determine a non-orthogonal layer quantity, where the determining unit 410 is further configured to determine a transport block size TBS, a processing unit 420, configured to encode data based on the non-orthogonal layer quantity and the TBS to obtain encoded data, and a sending unit 430, configured to send the encoded data to a second device.

In an optional embodiment, the determining unit 410 is specifically configured to determine the non-orthogonal layer quantity based on a modulation and coding scheme MCS table.

In an optional embodiment, the apparatus 400 is a terminal device, the second device is a network device, and the apparatus 400 further includes a first receiving unit, configured to receive the non-orthogonal layer quantity sent by the second device, and the determining unit 410 is specifically configured to determine the non-orthogonal layer quantity based on the non-orthogonal layer quantity received by the receiving unit.

In an optional embodiment, the determining unit 410 is further configured to determine a non-orthogonal layer before the encoded data is sent to the second device, where the sending module 430 is specifically configured to send the encoded data to the second device based on the non-orthogonal layer.

In an optional embodiment, the determining unit 410 is specifically further configured to determine a non-orthogonal start layer number, and determine the non-orthogonal layer based on the non-orthogonal start layer number and the non-orthogonal layer quantity.

In an optional embodiment, the apparatus 400 is a terminal device, the second device is a network device, and the first receiving unit is further configured to receive the non-orthogonal start layer number sent by the second device, and the determining unit 410 is specifically further configured to determine the non-orthogonal start layer number based on the non-orthogonal start layer number received by the first receiving unit.

In an optional embodiment, the determining unit 410 is specifically further configured to determine the non-orthogonal start layer number based on the MCS table.

In an optional embodiment, the determining unit 410 is specifically further configured to determine the TBS in a TBS table based on the non-orthogonal layer quantity.

In an optional embodiment, the apparatus 400 is a terminal device, the second device is a network device, and the apparatus 400 further includes a second receiving unit, configured to receive physical resource block size information sent by the network device, before the TBS is determined in the TBS table based on the non-orthogonal layer quantity, where the determining unit 210 is specifically further configured to determine the TBS in the TBS table based on the physical resource block size information and the non-orthogonal layer quantity.

In an optional embodiment, the apparatus 400 is a terminal device, the second device is a network device, and the apparatus 400 further includes a third receiving unit, configured to receive a spreading factor sent by the second device, before the TBS is determined in the TBS table based on the non-orthogonal layer quantity. The determining unit 410 is specifically further configured to determine the TBS in the TBS table based on the spreading factor and the non-orthogonal layer quantity.

In an optional embodiment, the TBS in the TBS table is determined according to a formula (33), where TBS_new represents the TBS in the TBS table, TBS_old represents an old TBS in an old TBS table, Layer represents the non-orthogonal layer quantity, and SF represents the spreading factor.

In an optional embodiment, the determining unit 410 is further configured to before the TBS is determined in the TBS table based on the spreading factor and the non-orthogonal layer quantity, determine an old TBS in an old TBS table, and determine the TBS table based on the formula (33).

In an optional embodiment, the determining unit 410 is further configured to determine a power offset before the encoded data is sent to the second device, and the sending unit 430 is specifically further configured to send the encoded data to the second device based on the power offset.

In an optional embodiment, the apparatus 400 is a terminal device, the second device is a network device, and the apparatus further includes a fourth receiving unit, configured to receive the power offset sent by the second device. The determining unit 210 is specifically further configured to determine the power offset based on the power offset received by the fourth receiving unit.

In an optional embodiment, the determining unit 410 is specifically further configured to determine the power offset based on the MCS table.

In an optional embodiment, the determining unit 410 is specifically further configured to determine the power offset based on the TBS table.

In an optional embodiment, the determining unit 410 is specifically further configured to determine the power offset based on a bit rate and/or a modulation order.

It should be understood that the apparatus 400 herein is represented in a form of a functional unit. The term "unit" herein may refer to an application-specific integrated circuit (ASIC), an electronic circuit, a processor for performing one or more software or firmware programs (for example, a shared processor, a proprietary processor, or a packet processor), a memory, a combined logic circuit, and/or another appropriate component supporting the described function. In an optional example, a person skilled in the art may understand that the apparatus 400 may be specifically the first device in the foregoing embodiment. The apparatus 400 may be configured to perform procedures and/or steps in the foregoing method embodiment that correspond to the first device. To avoid repetition, details are not described herein again.

Figure 12:
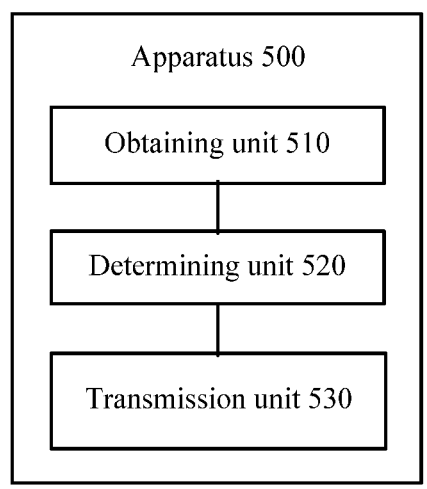
FIG. 12 is a schematic block diagram of another data transmission apparatus according to an embodiment of this application.

FIG. 12 shows a service processing apparatus 500 according to an embodiment of this application. The apparatus 500 includes an obtaining unit 510, configured to obtain a first parameter, where the first parameter is used to indicate a quantity of resource elements included in a resource mapping unit, a determining unit 520, configured to determine a first transport block size based on the first parameter, and a transmission unit 530, configured to transmit data based on the first transport block size.

In an optional embodiment, the obtaining unit 510 is further configured to obtain a quantity of resource elements that are in an allocated physical resource and that are used to transmit data, a spatial layer quantity, a modulation order, and a bit rate, and the determining unit 520 is specifically configured to determine the first transport block size based on the quantity of resource elements that are in the allocated physical resource and that are used to transmit data, the spatial layer quantity, the modulation order, the bit rate, and the first parameter.

In an optional embodiment, the obtaining unit 510 is further configured to obtain a non-orthogonal layer quantity corresponding to each spatial layer, and the determining unit 520 is specifically configured to determine the first transport block size based on the quantity of resource elements that are in the allocated physical resource and that are used to transmit data, the spatial layer quantity, the modulation order, the bit rate, the first parameter, and the non-orthogonal layer quantity corresponding to each spatial layer.

In an optional embodiment, the determining unit 520 is specifically configured to determine the first transport block size according to any one of formulas (1), (2), and (3).

In an optional embodiment, the determining unit 520 is specifically configured to determine the first transport block size according to any one of formulas (4), (5), and (6).

In an optional embodiment, the determining unit 520 is specifically configured to determine the first transport block size according to any one of formulas (7), (8), and (9).

In an optional embodiment, the transmission unit 530 is specifically configured to perform a first operation on the first transport block size to obtain a second transport block size, and transmit the data by using the second transport block size.

It should be understood that the apparatus 500 herein is represented in a form of a functional unit. The term "unit" herein may refer to an application-specific integrated circuit (ASIC), an electronic circuit, a processor for performing one or more software or firmware programs (for example, a shared processor, a proprietary processor, or a packet processor), a combined logic circuit, and/or another appropriate component supporting the described function. In an optional example, a person skilled in the art may understand that, the apparatus 500 may be specifically the first device in the foregoing method embodiments, and the apparatus 500 may be configured to perform each procedure and/or step corresponding to the first device in the foregoing method embodiments. To avoid repetition, details are not described herein again.

The apparatus 400 may be the first device in the embodiment of the method 200, and the apparatus 500 may be the first device in the embodiment of the method 300. A corresponding unit performs a corresponding step. For example, a transceiver unit performs a receiving and sending step in the method embodiment, and other steps than the receiving and sending step may be performed by a processing module. For a function of a specific module, refer to a corresponding method embodiment. Details are not described again.

The first device in each solution described above has a function of implementing a corresponding step performed by the first device in the foregoing methods. The function may be implemented by using hardware, or may be implemented by using hardware by executing corresponding software. The hardware or the software includes one or more modules corresponding to the foregoing function. For example, the sending unit may be replaced with a transmitter, the receiving unit may be replaced with a receiver, and another unit, for example, the determining unit, may be replaced with a processor, to implement a receiving and sending operation in each method embodiment and a related processing operation.

In the embodiments of this application, the apparatuses in FIG. 11 and FIG. 12 may be alternatively a chip or a chip system, for example, a system on chip (SoC). Correspondingly, the receiving unit and the sending unit may be a transceiver circuit of the chip, and no limitation is imposed herein.

Figure 13:
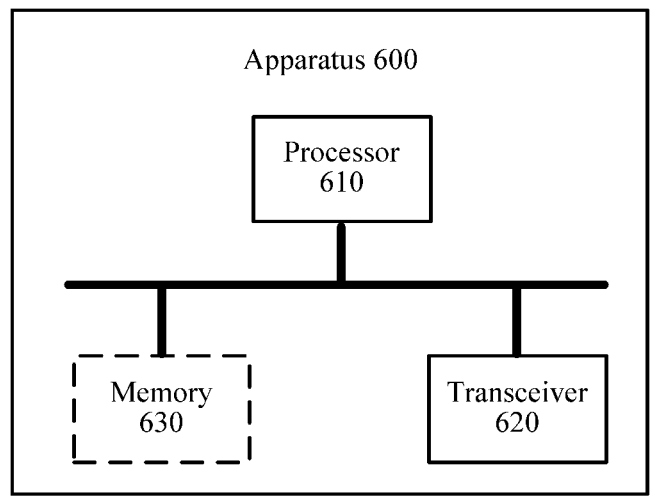
FIG. 13 is a schematic block diagram of still another data transmission apparatus according to an embodiment of this application.

FIG. 13 shows another data transmission apparatus 600 according to an embodiment of this application. The apparatus 600 includes a processor 610 and a transceiver 620. Optionally, the apparatus 600 further includes a memory 630. The processor 610, the transceiver 620, and the memory 630 communicate with each other by using an internally connected channel. The memory 630 is configured to store an instruction, and the processor 610 is configured to execute the instruction stored in the memory 630, to control the transceiver 620 to send a signal and/or receive a signal.

The processor 610 is configured to determine a non-orthogonal layer quantity. The processor 610 is further configured to determine a transport block size TBS, and encode data based on the non-orthogonal layer quantity and the TBS, to obtain encoded data. The transceiver 620 is configured to send the encoded data to a second device. It should be understood that, the apparatus 600 may be specifically the first device in the embodiment of the method 200, and may be configured to perform each step and/or procedure corresponding to the first device in the foregoing method embodiments. Optionally, the memory 630 may include a read-only memory and a random access memory, and provide an instruction and data to the processor. A part of the memory may further include a non-volatile random access memory. For example, the memory may further store device type information. The processor 610 may be configured to execute the instruction stored in the memory, and when the processor 610 executes the instruction stored in the memory, the processor 610 is configured to perform each step and/or procedure in the method embodiments corresponding to the first device.

Figure 14:
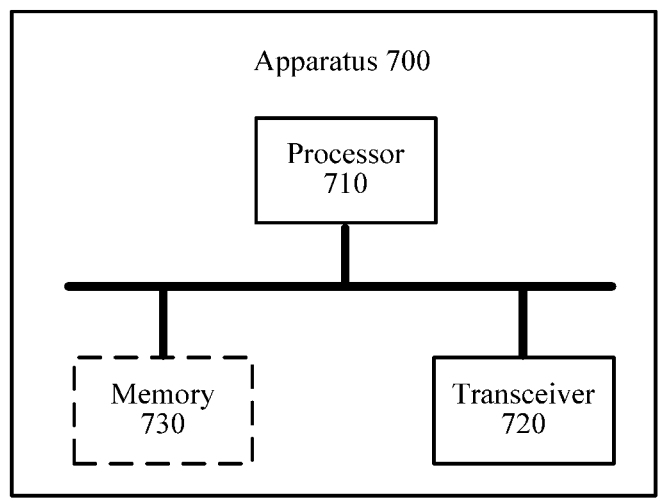
FIG. 14 is a schematic block diagram of still another data transmission apparatus according to an embodiment of this application.

FIG. 14 shows another data transmission apparatus 700 according to an embodiment of this application. The apparatus 700 includes a processor 710 and a transceiver 720. Optionally, the apparatus 700 further includes a memory 730. The processor 710, the transceiver 720, and the memory 730 communicate with each other by using an internally connected channel. The memory 730 is configured to store an instruction, and the processor 710 is configured to execute the instruction stored in the memory 730, to control the transceiver 720 to send a signal and/or receive a signal.

The transceiver 720 is configured to obtain a first parameter, where the first parameter is used to indicate a quantity of resource elements included in a resource mapping unit. The processor 710 is configured to determine a first transport block size based on the first parameter. The transceiver 720 is configured to transmit data based on the first transport block size.

It should be understood that the apparatus 700 may be specifically the first device in the embodiment of the method 300, and may be configured to perform each step and/or procedure corresponding to the first device in the foregoing method embodiments. Optionally, the memory 730 may include a read-only memory and a random access memory, and provide an instruction and data to the processor. A part of the memory may further include a non-volatile random access memory. For example, the memory may further store device type information. The processor 710 may be configured to execute the instruction stored in the memory, and when the processor 710 executes the instruction stored in the memory, the processor 710 is configured to perform each step and/or procedure of the method embodiment corresponding to the terminal.

In an embodiment, the transceiver may be a communications interface that is used for the apparatus to connect to another device or component, and that is configured to receive a signal sent by the another device or component and/or send, to the another device or component, a signal that needs to be output. In another embodiment, the transceiver may include a transmitter and a receiver. The transceiver may further include an antenna, and there may be one or more antennas. The memory may be a separate component, or may be integrated into the processor. The foregoing components or some components may be integrated into a chip for implementation, for example, integrated into a baseband chip for implementation.

In the embodiments of this application, the transceiver in FIG. 13 and FIG. 14 may be a communications interface, and no limitation is imposed herein.

In the embodiments of this application, the first device may be a physical device or may be a virtual functional network element, and no limitation is imposed herein.

In the embodiments of this application, for ease of understanding, a plurality of examples are used for description. However, these examples are merely examples, but do not mean optimal implementations for implementing this application.

It should also be understood that, in the embodiments of this application, the processor of the apparatus may be a central processing unit (CPU). The processor may be alternatively another general purpose processor, a digital signal processor (DSP), an application-specific integrated circuit (ASIC), a field-programmable gate array (FPGA) or another programmable logic device, a discrete gate or a transistor logic device, or a discrete hardware component. The general purpose processor may be a microprocessor or the processor may be any conventional processor, or the like.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software unit. The software unit may be located in a mature or non-transitory storage medium in the art, such as a random memory, a flash memory, a read-only memory, a programmable read-only memory, an electrically erasable programmable memory, or a register. The storage medium is located in the memory, and a processor executes instructions in the memory and completes the steps in the foregoing methods in combination with hardware of the processor. To avoid repetition, details are not described herein again.

All or some of the foregoing embodiments may be implemented by means of software, hardware, firmware, or any combination thereof. When software is used to implement the embodiments, the embodiments may be implemented partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a Solid-state disk (SSD)), or the like.

Persons of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

Further, this application further provides the following embodiments. It should be noted that, numbers of the following embodiments do not need to conform to a sequence of the numbers of the foregoing embodiments.

Embodiment 1. A data transmission method, where the method includes determining, by a first device, a non-orthogonal layer quantity, determining, by the first device, a transport block size TBS, encoding, by the first device, data based on the non-orthogonal layer quantity and the TBS to obtain encoded data, and sending, by the first device, the encoded data to a second device.

Embodiment 2. According to the method in Embodiment 1, the determining, by a first device, a non-orthogonal layer quantity includes determining, by the first device, the non-orthogonal layer quantity based on a modulation and coding scheme MCS table.

Embodiment 3. According to the method in Embodiment 1 or 2, the determining, by a first device, a non-orthogonal layer quantity includes receiving, by the first device, the non-orthogonal layer quantity sent by the second device.

Embodiment 4. According to the method in any one of Embodiments 1 to 3, before the sending, by the first device, the encoded data to a second device, the method further includes determining, by the first device, a non-orthogonal layer, and the sending, by the first device, the encoded data to a second device includes sending, by the first device, the encoded data to the second device based on the non-orthogonal layer.

Embodiment 5. According to the method in Embodiment 4, the determining, by the first device, a non-orthogonal layer includes determining, by the first device, a non-orthogonal start layer number, determining, by the first device, the non-orthogonal layer based on the non-orthogonal start layer number and the non-orthogonal layer quantity.

Embodiment 6. According to the method in Embodiment 5, the determining, by the first device, a non-orthogonal start layer number includes receiving, by the first device, the non-orthogonal start layer number sent by the second device, or determining, by the first device, the non-orthogonal start layer number based on the MCS table.

Embodiment 7. According to the method in any one of Embodiments 1 to 6, the determining, by the first device, a transport block size TBS includes determining, by the first device, the TBS in a TBS table based on the non-orthogonal layer quantity.

Embodiment 8. According to the method in Embodiment 7, before the determining, by the first device, the TBS in a TBS table based on the non-orthogonal layer quantity, the method further includes receiving, by the first device, physical resource block size information sent by the second device, where the determining, by the first device, the TBS in a TBS table based on the non-orthogonal layer quantity includes determining, by the first device, the TBS in the TBS table based on the physical resource block size information and the non-orthogonal layer quantity.

Embodiment 9. According to the method in Embodiment 7 or 8, before the determining, by the first device, the TBS in a TBS table based on the non-orthogonal layer quantity, the method further includes receiving, by the first device, a spreading factor sent by the second device, where the determining, by the first device, the TBS in a TBS table based on the non-orthogonal layer quantity includes determining, by the first device, the TBS in the TBS table based on the spreading factor and the non-orthogonal layer quantity.

Embodiment 10. According to the method in Embodiment 9, the TBS in the TBS table is determined according to a formula (1), TBS_new=floor(TBS_old*Layer/SF) (1) where TBS_new represents the TBS in the TBS table, TBS_old represents an old TBS in an old TBS table, Layer represents the non-orthogonal layer quantity, and SF represents the spreading factor.

Embodiment 11. According to the method in Embodiment 9, before the determining, by the first device, the TBS in the TBS table based on the spreading factor and the non-orthogonal layer quantity, the method further includes determining, by the first device, an old TBS in an old TBS table, and determining, by the first device, the TBS table according to a formula (2), TBS_new=floor(TBS_old*Layer/SF) (2) where TBS_new represents the TBS in the TBS table, TBS_old represents the old TBS in the old TBS table, Layer represents the non-orthogonal layer quantity, and SF represents the spreading factor.

Embodiment 12. According to the method in any one of Embodiments 1 to 11, before the sending, by the first device, the encoded data to a second device, the method further includes determining, by the first device, a power offset, where the sending, by the first device, the encoded data to a second device includes sending, by the first device, the encoded data to the second device based on the power offset.

Embodiment 13. According to the method in Embodiment 12, the determining, by the first device, a power offset includes receiving, by the first device, the power offset sent by the second device, determining, by the first device, the power offset based on the MCS table, determining, by the first device, the power offset based on the TBS table, or determining, by the first device, the power offset based on a bit rate and/or a modulation order.

Embodiment 14. A data transmission apparatus, where the apparatus includes a determining module, configured to determine a non-orthogonal layer quantity, where the determining module is further configured to determine a transport block size TBS, a processing module, configured to encode data based on the non-orthogonal layer quantity and the TBS to obtain encoded data, and a sending module, configured to send the encoded data to a second device.

Embodiment 15. According to the apparatus in Embodiment 14, the determining module is specifically configured to determine the non-orthogonal layer quantity based on a modulation and coding scheme MCS table.

Embodiment 16. According to the apparatus in Embodiment 14 or 15, the apparatus further includes a first receiving module, configured to receive the non-orthogonal layer quantity sent by the second device, where the determining module is specifically configured to determine the non-orthogonal layer quantity based on the non-orthogonal layer quantity received by the receiving module.

Embodiment 17. According to the apparatus in any one of Embodiments 14 to 16, the determining module is further configured to determine a non-orthogonal layer before the encoded data is sent to the second device, and the sending module is specifically configured to send the encoded data to the second device based on the non-orthogonal layer.

Embodiment 18. According to the apparatus in Embodiment 17, the determining module is specifically further configured to determine a non-orthogonal start layer number, and determine the non-orthogonal layer based on the non-orthogonal start layer number and the non-orthogonal layer quantity.

Embodiment 19. According to the apparatus in Embodiment 18, the first receiving module is further configured to receive the non-orthogonal start layer number sent by the second device, and the determining module is specifically further configured to determine the non-orthogonal start layer number based on the non-orthogonal start layer number received by the receiving module, or the determining module is specifically further configured to determine the non-orthogonal start layer number based on the MCS table.

Embodiment 20. According to the apparatus in any one of Embodiments 14 to 19, the determining module is specifically further configured to determine the TBS in a TBS table based on the non-orthogonal layer quantity.

Embodiment 21. According to the apparatus in Embodiment 20, the apparatus further includes a second receiving module, configured to receive physical resource block size information sent by the second device, before the TBS is determined in the TBS table based on the non-orthogonal layer quantity, where the determining module is specifically further configured to determine the TBS in the TBS table based on the physical resource block size information and the non-orthogonal layer quantity.

Embodiment 22. According to the apparatus in Embodiment 20 or 21, the apparatus further includes a third receiving module, configured to receive a spreading factor sent by the second device, before the TBS is determined in the TBS table based on the non-orthogonal layer quantity, where the determining module is specifically further configured to determine the TBS in the TBS table based on the spreading factor and the non-orthogonal layer quantity.

Embodiment 23. According to the apparatus in Embodiment 22, the TBS in the TBS table is determined according to a formula (1), TBS_new=floor(TBS_old*Layer/SF) (1) where TBS_new represents the TBS in the TBS table, TBS_old represents an old TBS in an old TBS table, Layer represents the non-orthogonal layer quantity, and SF represents the spreading factor.

Embodiment 24. According to the apparatus in Embodiment 22, the determining module is further configured to before the TBS is determined in the TBS table based on the spreading factor and the non-orthogonal layer quantity, determine an old TBS in an old TBS table, and determine the TBS table according to a formula (2) TBS_new=floor (TBS_old*Layer/SF) (2) where TBS_new represents the TBS in the TBS table, TBS_old represents the old TBS in the old TBS table, Layer represents the non-orthogonal layer quantity, and SF represents the spreading factor.

Embodiment 25. According to the apparatus in any one of Embodiments 14 to 24, the determining module is further configured to determine a power offset before the encoded data is sent to the second device, and the sending module is specifically further configured to send the encoded data to the second device based on the power offset.

Embodiment 26. According to the apparatus in Embodiment 25, the apparatus further includes a fourth receiving module, configured to receive the power offset sent by the second device, where the determining module is specifically further configured to determine the power offset based on the power offset received by the fourth receiving module, the determining module is specifically further configured to determine the power offset based on the MCS table, the determining module is specifically further configured to determine the power offset based on the TBS table, or the determining module is specifically further configured to determine the power offset based on a bit rate and/or a modulation order.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
    obtaining, by a first device, a first parameter, wherein the first parameter indicates a quantity of resource elements of a resource mapping unit, wherein obtaining the first parameter comprises obtaining, by the first device, a quantity of resource elements that are in an allocated physical resource and that are used to transmit data, and obtaining a spatial layer quantity, a modulation order, and a bit rate;
    determining, by the first device, a first transport block size according to the first parameter, the spatial layer quantity, the quantity of resource elements that are in the allocated physical resource and that are used to transmit data, the modulation order, the bit rate, and a non-orthogonal layer quantity corresponding to each spatial layer indicated by the spatial layer quantity; and
    transmitting, by the first device, data according to the first transport block size.

2. The method according to claim 1, wherein the method further comprises:
    obtaining, by the first device, the non-orthogonal layer quantity corresponding to each spatial layer indicated by the spatial layer quantity.

3. The method according to claim 2, wherein the determining the first transport block size according to the quantity of resource elements that are in the allocated physical resource and that are used to transmit data, the spatial layer quantity, the modulation order, the bit rate, the first parameter, and the non-orthogonal layer quantity corresponding to each spatial layer comprises:
    determining, by the first device, the first transport block size according to any one of formulas (4), (5), or (6);

$$TBS = N \cdot v \cdot Q \cdot R \cdot L \cdot / F \quad (4)$$

$$TBS = \text{floor}(N \cdot v \cdot Q \cdot R \cdot L \cdot / F) \quad (5)$$

$$TBS = \text{ceil}(N \cdot v \cdot Q \cdot R \cdot L \cdot / F) \quad (6)$$

wherein TBS represents the first transport block size, N represents the quantity of resource elements that are in the allocated physical resource and that are used to transmit data, v represents the spatial layer quantity, Q represents the modulation order, R represents the bit rate, L represents the non-orthogonal layer quantity corresponding to each spatial layer, F represents the first parameter, F represents the first parameter, floor( ) represents rounding down, and ceil( ) represents rounding up.

4. The method according to claim 2, wherein the determining the first transport block size according to the quantity of resource elements that are in the allocated physical resource and that are used to transmit data, the spatial layer quantity, the modulation order, the bit rate, the first parameter, and the non-orthogonal layer quantity corresponding to each spatial layer comprises:
    determining, by the first device, the first transport block size according to any one of formulas (7), (8), or (9);

$$TBS = N \cdot Q \cdot R \cdot \Sigma_{i=1}^{v} L_i / F \quad (7)$$

$$TBS = \text{floor}(N \cdot Q \cdot R \cdot \Sigma_{i=1}^{v} L_i / F) \quad (8)$$

$$TBS = \text{ceil}(N \cdot Q \cdot R \cdot \Sigma_{i=1}^{v} L_i / F) \quad (9)$$

wherein TBS represents the first transport block size, N represents the quantity of resource elements that are in the allocated physical resource allocated on a first transmission resource and that are used to transmit data, v represents the spatial layer quantity, Q represents the modulation order, R represents the bit rate, $L_i$ represents a non-orthogonal layer quantity corresponding to an $i^{th}$ spatial layer, F represents the first parameter, floor( ) represents rounding down, and ceil( ) represents rounding up.

5. The method according to claim 1, wherein the determining the first transport block size according to the quantity of resource elements that are in the allocated physical resource and that are used to transmit data, the spatial layer quantity, the modulation order, the bit rate, and the first parameter comprises:
    determining, by the first device, the first transport block size according to any one of formulas (1), (2), or (3);

$$TBS = N \cdot v \cdot Q \cdot R / F \quad (1)$$

$$TBS = \text{floor}(N \cdot v \cdot Q \cdot R / F) \quad (2)$$

$$TBS = \text{ceil}(N \cdot v \cdot Q \cdot R / F) \quad (3)$$

wherein TBS represents the first transport block size, N represents the quantity of resource elements that are in the allocated physical resource and that are used to transmit data, v represents the spatial layer quantity, Q represents the modulation order, R represents the bit rate, F represents the first parameter, floor( ) represents rounding down, and ceil( ) represents rounding up.

6. The method according to claim 1, wherein the transmitting the data according to the first transport block size comprises:
obtaining a second transport block size by the first device by performing a first operation on the first transport block size; and
transmitting, by the first device, the data using the second transport block size.

7. A data transmission apparatus, comprising:
an obtaining unit, configured to obtain a first parameter, wherein the first parameter indicates a quantity of resource elements of a resource mapping unit, wherein the obtaining unit being configured to obtain the first parameter comprises the obtaining unit being configured to obtain a quantity of resource elements that are in an allocated physical resource and that are used to transmit data, and further obtain a spatial layer quantity, a modulation order, and a bit rate;
a determining unit, configured to determine a first transport block size according to the first parameter, a spatial layer quantity, the quantity of resource elements that are in the allocated physical resource and that are used to transmit data, the modulation order, the bit rate, and a non-orthogonal layer quantity corresponding to each spatial layer indicated by the spatial layer quantity; and
a transmission unit, configured to transmit data according to the first transport block size.

8. The apparatus according to claim 7, wherein the obtaining unit is further configured to:
obtain the non-orthogonal layer quantity corresponding to each spatial layer indicated by the spatial layer quantity.

9. The apparatus according to claim 8, wherein the determining unit is configured to:
determine the first transport block size according to any one of formulas (4), (5), or (6);

$$\text{TBS}=N \cdot v \cdot Q \cdot R \cdot L_v / F \tag{4}$$

$$\text{TBS}=\text{floor}(N \cdot v \cdot Q \cdot R \cdot L_v / F) \tag{5}$$

$$\text{TBS}=\text{ceil}(N \cdot v \cdot Q \cdot R \cdot L_v / F) \tag{6}$$

wherein TBS represents the first transport block size, N represents the quantity of resource elements that are in the allocated physical resource and that are used to transmit data, v represents the spatial layer quantity, Q represents the modulation order, R represents the bit rate, L represents the non-orthogonal layer quantity corresponding to each spatial layer, F represents the first parameter, F represents the first parameter, floor( ) represents rounding down, and ceil( ) represents rounding up.

10. The apparatus according to claim 8, wherein the determining unit is configured to:
determine the first transport block size according to any one of formulas (7), (8), or (9);

$$\text{TBS}=N \cdot Q \cdot R \cdot \Sigma_{i=1}^{v} L_i / F \tag{7}$$

$$\text{TBS}=\text{floor}(N \cdot Q \cdot R \cdot \Sigma_{i=1}^{v} L_i / F) \tag{8}$$

$$\text{TBS}=\text{ceil}(N \cdot Q \cdot R \cdot \Sigma_{i=1}^{v} L_i / F) \tag{9}$$

wherein TBS represents the first transport block size, N represents the quantity of resource elements that are in the allocated physical resource allocated on a first transmission resource and that are used to transmit data, v represents the spatial layer quantity, Q represents the modulation order, R represents the bit rate, $L_i$ represents a non-orthogonal layer quantity corresponding to an $i^{th}$ spatial layer, F represents the first parameter, floor( ) represents rounding down, and ceil( ) represents rounding up.

11. The apparatus according to claim 7, wherein the determining unit is configured to:
determine the first transport block size according to any one of formulas (1), (2), or (3);

$$\text{TBS}=N \cdot v \cdot Q \cdot R / F \tag{1}$$

$$\text{TBS}=\text{floor}(N \cdot v \cdot Q \cdot R / F) \tag{2}$$

$$\text{TBS}=\text{ceil}(N \cdot v \cdot Q \cdot R / F) \tag{3}$$

wherein TBS represents the first transport block size, N represents the quantity of resource elements that are in the allocated physical resource and that are used to transmit data, v represents the spatial layer quantity, Q represents the modulation order, R represents the bit rate, F represents the first parameter, floor( ) represents rounding down, and ceil( ) represents rounding up.

12. The apparatus according to claim 7, wherein the transmission unit is configured to:
obtain a second transport block size by performing a first operation on the first transport block size; and
transmit the data using the second transport block size.

13. An apparatus, comprising:
a transmitter;
one or more processors;
a non-transitory computer-readable storage medium storing a program to be executed by the one or more processors, the program including instructions to:
obtain a first parameter, wherein the first parameter indicates a quantity of resource elements in a resource mapping unit, wherein the instructions to obtain the first parameter include instructions to obtain a quantity of resource elements that are in an allocated physical resource and that are used to transmit data, and to obtain a spatial layer quantity, a modulation order, and a bit rate;
determine a first transport block size according to the first parameter, a spatial layer quantity, the quantity of resource elements that are in the allocated physical resource and that are used to transmit data, and further determine the modulation order, the bit rate, and a non-orthogonal layer quantity corresponding to each spatial layer indicated by the spatial layer quantity; and
cause the transmitter to transmit data according to the first transport block size.

14. The apparatus according to claim 13, wherein the instructions to determine the first transport block size include instructions to:
determine the first transport block size according to any one of formulas (1), (2), or (3);

$$\text{TBS}=N \cdot v \cdot Q \cdot R / F \tag{1}$$

$$\text{TBS}=\text{floor}(N \cdot v \cdot Q \cdot R / F) \tag{2}$$

$$\text{TBS}=\text{ceil}(N \cdot v \cdot Q \cdot R / F) \tag{3}$$

wherein TBS represents the first transport block size, N represents the quantity of resource elements that are in the allocated physical resource and that are used to transmit data, v represents the spatial layer quantity, Q represents the modulation order, R represents the bit rate, F represents the first parameter, floor( ) represents rounding down, and ceil( ) represents rounding up.

15. The apparatus according to claim 13, wherein the instructions to determine the first transport block size according to the quantity of resource elements that are in the allocated physical resource and that are used to transmit data, the spatial layer quantity, the modulation order, the bit rate, the first parameter, and the non-orthogonal layer quantity corresponding to each spatial layer include instructions to:
determine the first transport block size according to any one of formulas (4), (5), or (6);

$$TBS = N \cdot v \cdot Q \cdot R \cdot L \cdot / F \qquad (4)$$

$$TBS = \text{floor}(N \cdot v \cdot Q \cdot R \cdot L \cdot / F) \qquad (5)$$

$$TBS = \text{ceil}(N \cdot v \cdot Q \cdot R \cdot L \cdot / F) \qquad (6)$$

wherein TBS represents the first transport block size, N represents the quantity of resource elements that are in the allocated physical resource and that are used to transmit data, v represents the spatial layer quantity, Q represents the modulation order, R represents the bit rate, L represents the non-orthogonal layer quantity corresponding to each spatial layer, F represents the first parameter, F represents the first parameter, floor( ) represents rounding down, and ceil( ) represents rounding up.

16. The apparatus according to claim 13, wherein the instructions to obtain the quantity of resource elements that are in the allocated physical resource and that are used to transmit the data, the spatial layer quantity, the modulation order, and the bit rate include instructions to:
obtain the non-orthogonal layer quantity corresponding to each spatial layer indicated by the spatial layer quantity.

17. The apparatus according to claim 16, wherein the instructions to determine the first transport block size according to the quantity of resource elements that are in the allocated physical resource and that are used to transmit data, the spatial layer quantity, the modulation order, the bit rate, the first parameter, and the non-orthogonal layer quantity corresponding to each spatial layer include instructions to:
determine the first transport block size according to any one of formulas (7), (8), or (9);

$$TBS = N \cdot Q \cdot R \cdot \Sigma_{i=1}^{v} L_i / F \qquad (7)$$

$$TBS = \text{floor}(N \cdot Q \cdot R \cdot \Sigma_{i=1}^{v} L_i / F) \qquad (8)$$

$$TBS = \text{ceil}(N \cdot Q \cdot R \cdot \Sigma_{i=1}^{v} L_i / F) \qquad (9)$$

wherein TBS represents the first transport block size, N represents the quantity of resource elements that are in the physical resource allocated on a first transmission resource and that are used to transmit data, v represents the spatial layer quantity, Q represents the modulation order, R represents the bit rate, $L_i$ represents a non-orthogonal layer quantity corresponding to an $i^{th}$ spatial layer, F represents the first parameter, floor( ) represents rounding down, and ceil( ) represents rounding up.

* * * * *